United States Patent
Yoshioka et al.

(10) Patent No.: US 8,661,796 B2
(45) Date of Patent: Mar. 4, 2014

(54) VEHICLE CONTROL DEVICE

(75) Inventors: Mamoru Yoshioka, Susono (JP); Noriaki Kumagai, Susono (JP); Naoya Takagi, Mishima (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 36 days.

(21) Appl. No.: 13/512,162

(22) PCT Filed: Mar. 17, 2010

(86) PCT No.: PCT/JP2010/054532
§ 371 (c)(1),
(2), (4) Date: May 25, 2012

(87) PCT Pub. No.: WO2011/114451
PCT Pub. Date: Sep. 22, 2011

(65) Prior Publication Data
US 2012/0260638 A1      Oct. 18, 2012

(51) Int. Cl.
*F01N 3/10*        (2006.01)

(52) U.S. Cl.
USPC ............................... 60/300; 60/295

(58) Field of Classification Search
USPC .................................... 60/295, 300
See application file for complete search history.

(56) References Cited

U.S. PATENT DOCUMENTS

| | | | |
|---|---|---|---|
| 5,070,694 A * | 12/1991 | Whittenberger | 60/300 |
| 5,582,803 A * | 12/1996 | Yoshizaki et al. | 422/174 |
| 2005/0160719 A1 * | 7/2005 | Jankowski et al. | 60/284 |

FOREIGN PATENT DOCUMENTS

| JP | 5-269387 A | 10/1993 |
|---|---|---|
| JP | 5-96424 U | 12/1993 |
| JP | 2002-021541 A | 1/2002 |
| JP | 2005-009364 A | 1/2005 |
| JP | 2008-291801 A | 12/2008 |

\* cited by examiner

*Primary Examiner* — Thomas Denion
*Assistant Examiner* — Jason Shanske
(74) *Attorney, Agent, or Firm* — Sughrue Mion, PLLC

(57) ABSTRACT

A vehicle control device applied to a vehicle including an internal combustion engine and an electrically heated catalyst which is warmed by applying a current, and includes a catalyst carrier supporting a catalyst and a carrier retention unit that retains the catalyst carrier and has an electrical insulation property. The vehicle control device includes an insulation resistance determination unit which determines whether or not an insulation resistance of the carrier retention unit decreases to a value equal to or lower than a predetermined value, and an applying current prohibition unit which prohibits applying the current to the electrically heated catalyst when the insulation resistance determination unit determines that the insulation resistance decreases to the value equal to or lower than the predetermined value. Therefore, it is possible to appropriately control of applying the current to the electrically heated catalyst based on the insulation property of the carrier retention unit, and hence it becomes possible to appropriately prevent an electrical leak of the electrically heated catalyst.

11 Claims, 13 Drawing Sheets

201: ACCELERATOR OPENING DEGREE SENSOR
202: VEHICLE SPEED SENSOR
203: OUTSIDE AIR-TEMPERATURE SENSOR

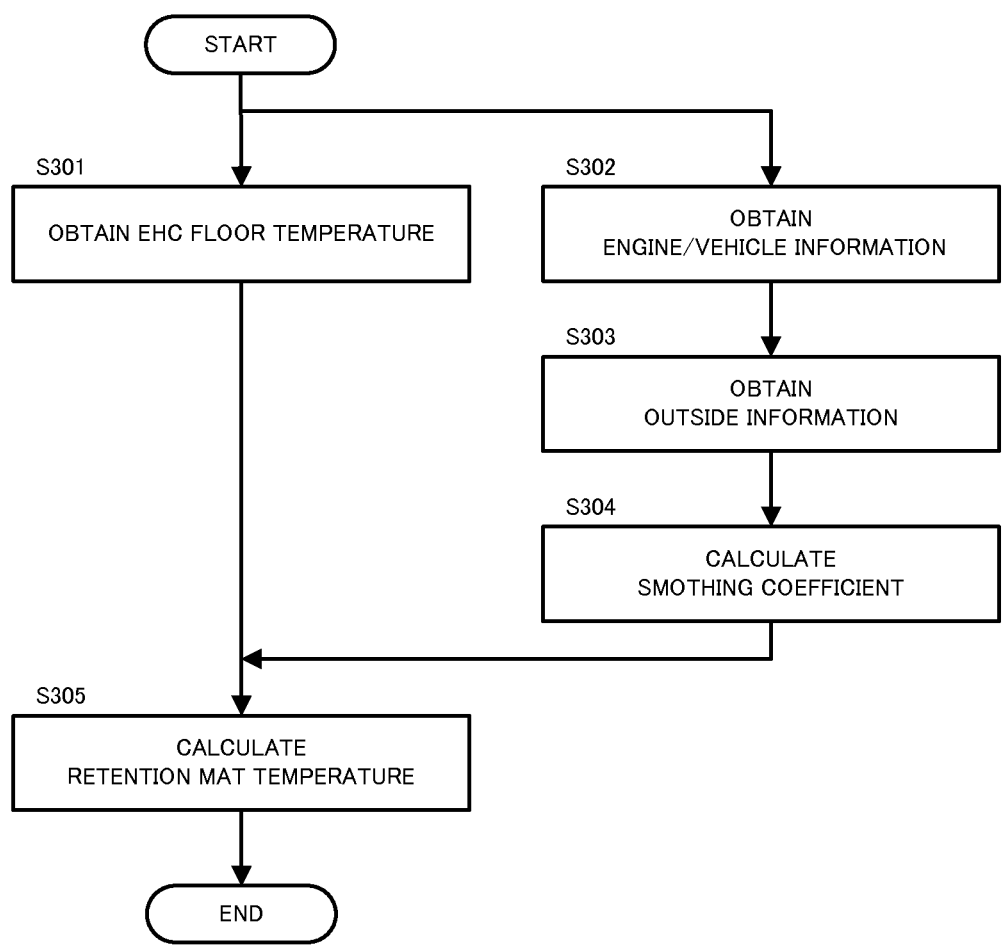

VEHICLE CONTROL DEVICE

TECHNICAL FIELD

The present invention relates to a vehicle control device including an electrically heated catalyst on an exhaust passage.

BACKGROUND TECHNIQUE

Conventionally, there is proposed a technique for purifying an exhaust gas by using an electrically heated catalyst (hereinafter suitably referred to as "EHC") provided on an exhaust passage. For example, in Patent Reference-1, there is proposed an EHC including a ring-like mat member formed by an electrical insulating material, which has a shock-absorbing characteristic and is positioned between an outer periphery of a catalyst carrier and an inner periphery of a metal shell. Additionally, in Patent Reference-2, there is proposed a technique for estimating a temperature of a seal mat which retains a catalyst.

Other than the above Patent References 1 and 2, there are disclosed a technique related to the present invention in Patent Reference-3, for example. In Patent Reference-3, there is proposed a technique for estimating a possibility of an electrical leak of the EHC based on a current or a voltage of the EHC, and for restricting a supply of an electric power to the EHC when there is a possibility of the electrical leak.

Hereinafter, a component which supports the catalyst in the EHC is referred to as "EHC carrier", and a component which retains the EHC carrier is referred to as "retention mat".

PRIOR ART REFERENCE

Patent Reference

Patent Reference-1: Japanese Patent Application Laid-open under No. 5-269387
Patent Reference-2: Japanese Patent Application Laid-open under No. 2005-9364
Patent Reference-3: Japanese Patent Application Laid-open under No. 2002-21541

DISCLOSURE OF INVENTION

Problem to be Solved by the Invention

Though the retention mat retaining the EHC carrier has an insulation property, it is thought that the insulation property changes by a condition of the retention mat. Concretely, it is thought that an insulation resistance of the retention mat changes. Therefore, it is preferable to estimate the insulation property of the EHC in consideration of the condition of the retention mat, and to control applying the current to the EHC. The above-mentioned Patent References 1 to 3 do not disclose that the control is performed in consideration of the condition of the retention mat in the EHC.

The present invention is made to solve the problem described above, and it is an object of the invention to provide a vehicle control device which can appropriately control applying a current to an EHC based on a condition of a retention mat in the EHC.

Means for Solving the Problem

According to one aspect of the present invention, there is provided a vehicle control device applied to a vehicle including an internal combustion engine and an electrically heated catalyst which is warmed by applying a current, and includes a catalyst carrier supporting a catalyst and a carrier retention unit that retains the catalyst carrier and has an electrical insulation property, including: an insulation resistance determination unit which determines whether or not an insulation resistance of the carrier retention unit decreases to a value equal to or lower than a predetermined value; and an applying current prohibition unit which prohibits applying the current to the electrically heated catalyst when the insulation resistance determination unit determines that the insulation resistance decreases to the value equal to or lower than the predetermined value.

The above vehicle control device is preferably applied to the vehicle including the electrically heated catalyst (EHC) which purifies the exhaust gas of the internal combustion engine and is warmed by applying the current. The electrically heated catalyst includes the catalyst carrier supporting the catalyst and the carrier retention unit which retains the catalyst carrier and has the electrical insulation property. The catalyst carrier corresponds to the EHC carrier, and the carrier retention unit corresponds to the retention mat. Additionally, the insulation resistance determination unit determines whether or not the insulation resistance of the carrier retention unit decreases to the value equal to or lower than the predetermined value, by using a predetermined condition. Concretely, the insulation resistance determination unit determines whether or not the insulation property of the electrically heated catalyst is ensured based on the insulation resistance of the carrier retention unit.

Then, the applying current prohibition unit prohibits applying the current to the electrically heated catalyst when the insulation resistance determination unit determines that the insulation resistance decreases to the value equal to or lower than the predetermined value. Concretely, even if a request for applying the current to the electrically heated catalyst for the purpose of a catalyst warming is issued, since it is said that the insulation property of the carrier retention unit is not ensured when the insulation resistance determination unit determines that the insulation resistance decreases to the value equal to or lower than the predetermined value, the applying current prohibition unit prohibits catalyst warming by applying the current. According to the above vehicle control device, by considering the condition of the carrier retention unit, it is possible to appropriately prohibit applying the current to the electrically heated catalyst. Therefore, it becomes possible to appropriately prevent the electrical leak of the electrically heated catalyst.

In a manner of the above vehicle control device, when a temperature of the carrier retention unit is equal to or higher than a predetermined temperature, the insulation resistance determination unit determines that the insulation resistance decreases to the value equal to or lower than the predetermined value.

According to the manner, when the temperature of the carrier retention unit is equal to or higher than the predetermined temperature, the insulation resistance determination unit determines that the insulation resistance decreases to the value equal to or lower than the predetermined value, and prohibits applying the current to the electrically heated catalyst. This is because, when the temperature of the carrier retention unit becomes higher, the insulation resistance tends to decrease. For example, the predetermined temperature used for the determination of the temperature of the carrier retention unit is set to a temperature corresponding to a predetermined value used for the insulation resistance. By the above manner, it is possible to prohibit applying the current when the temperature of the carrier retention unit is equal to or higher than the predetermined temperature, and hence it becomes possible to appropriately prevent the electrical leak of the electrically heated catalyst.

As a preferred example, the above vehicle control device further includes a temperature estimation unit which estimates the temperature of the carrier retention unit, based on heat transfers of the catalyst carrier, the carrier retention unit and a case covering the catalyst carrier and the carrier retention unit, and the insulation resistance determination unit performs the determination by using the temperature estimated by the temperature estimation unit.

For example, the temperature estimation unit estimates the temperature of the carrier retention unit in consideration of a temperature difference of each component in the electrically heated catalyst and a time delay of a heat transfer of each component in the electrically heated catalyst. Therefore, it is possible to accurately estimate the temperature of the carrier retention unit. Hence, based on the temperature of the carrier retention unit, it becomes possible to accurately determine whether or not the insulation resistance of the carrier retention unit decreases to the value equal to or lower than the predetermined value.

In another manner of the above vehicle control device, when an amount of water absorbed by the carrier retention unit is equal to or larger than a predetermined amount, the insulation resistance determination unit determines that the insulation resistance decreases to the value equal to or lower than the predetermined value.

According to the manner, when the amount of the water absorbed by the carrier retention unit is equal to or larger than the predetermined amount, the insulation resistance determination unit determines that the insulation resistance decreases to the value equal to or lower than the predetermined value, and prohibits applying the current to the electrically heated catalyst. This is because, when the amount of the water absorbed by the carrier retention unit becomes larger, the insulation resistance tends to decrease. For example, the predetermined amount used for the determination of the amount of the water is set to an amount of the water corresponding to a predetermined value used for the insulation resistance. By the above manner, it is possible to prohibit applying the current when the amount of the water absorbed by the carrier retention unit is equal to or larger than the predetermined amount, and hence it becomes possible to appropriately prevent the electrical leak of the electrically heated catalyst.

As a preferred example, the above vehicle control device further includes a water amount estimation unit which estimates the amount of the water absorbed by the carrier retention unit, based on an amount of condensate water generated in an exhaust passage, an amount of condensate water reaching the electrically heated catalyst in the condensate water generated in the exhaust passage and an evaporation coefficient indicating a proportion of an amount of water evaporated by an exhaust heat to the amount of the water absorbed by the carrier retention unit, and the insulation resistance determination unit performs the determination by using the amount of the water estimated by the water amount estimation unit.

According to the example, it is possible to accurately estimate the amount of the water absorbed by the carrier retention unit. Therefore, based on the amount of the water absorbed by the carrier retention unit, it becomes possible to accurately determine whether or not the insulation resistance of the carrier retention unit decreases to the value equal to or lower than the predetermined value.

As a further preferred example, the water amount estimation unit repeatedly performs the estimation of the amount of the water, and stores the amount of the water estimated last time so as to perform the estimation of the amount of the water by using the stored amount of the water estimated the last time, and the water amount estimation unit sets a maximum amount of the water absorbed by the carrier retention unit to the amount of the water estimated the last time so as to perform the estimation, when the stored amount of the water estimated the last time is cleared.

According to the example, when the stored amount of the water estimated the last time is cleared, it is possible to certainly prevent an incorrect determination of the insulation resistance of the carrier retention unit. For example, it is possible to prevent such an incorrect determination that the amount of the water absorbed by the carrier retention unit is smaller than the predetermined amount even though the amount of the water absorbed by the carrier retention unit is actually larger than the predetermined amount. Therefore, it becomes possible to appropriately prevent the electrical leak of the electrically heated catalyst.

In another manner, the above vehicle control device further includes a unit which performs a control of operating the internal combustion engine when the applying current prohibition unit prohibits applying the current to the electrically heated catalyst, and performs a control of continuing the operation of the internal combustion engine so that the water absorbed by the carrier retention unit is evaporated.

According to the manner, when the applying current prohibition unit prohibits applying the current to the electrically heated catalyst, the unit performs the control of operating the internal combustion engine in order to warm the catalyst, and performs the control of continuing the operation of the internal combustion engine so that the water absorbed by the carrier retention unit is evaporated. For example, after the catalyst is warmed by the operation of the internal combustion engine, the operation of the internal combustion engine is continued until the water absorbed by the carrier retention unit is evaporated. Therefore, since there is a substantially high possibility that the amount of the water absorbed by the carrier retention unit is lower than the predetermined amount when the request for applying the current to the electrically heated catalyst is issued next time, the possibility that the current can be applied to the electrically heated catalyst increases. Thereby, it is possible to decrease the frequency of the start of the internal combustion engine, and hence it becomes possible to suppress the deterioration of the drivability and to improve the fuel consumption.

In another manner of the above vehicle control device, when an amount of carbon deposited in the carrier retention unit is equal to or larger than a predetermined amount, the insulation resistance determination unit determines that the insulation resistance decreases to the value equal to or lower than the predetermined value.

According to the manner, when the amount of the carbon deposited in the carrier retention unit is equal to or larger than the predetermined amount, the insulation resistance determination unit determines that the insulation resistance decreases to the value equal to or lower than the predetermined value, and prohibits applying the current to the electrically heated catalyst. This is because, when the amount of the carbon deposited in the carrier retention unit becomes larger, the insulation resistance tends to decrease. For example, the predetermined amount used for the determination of the amount of the carbon is set to an amount of the carbon corresponding to a predetermined value used for the insulation resistance. By the above manner, it is possible to prohibit applying the current when the amount of the carbon deposited in the carrier retention unit is equal to or larger than the predetermined amount, and hence it becomes possible to appropriately prevent the electrical leak of the electrically heated catalyst.

As a preferred example, the above vehicle control device further includes a carbon amount estimation unit which estimates the amount of the carbon deposited in the carrier retention unit, based on an amount of carbon generated in an exhaust passage, an amount of carbon reaching the electrically heated catalyst in the carbon generated in the exhaust passage and a burned down coefficient indicating a proportion of an amount of burned down carbon to the amount of the carbon deposited in the carrier retention unit, and the insulation resistance determination unit performs the determination by using the amount of the carbon estimated by the carbon amount estimation unit.

According to the example, it is possible to accurately estimate the amount of the carbon deposited in the carrier retention unit. Therefore, based on the amount of the carbon deposited in the carrier retention unit, it becomes possible to accurately determine whether or not the insulation resistance of the carrier retention unit decreases to the value equal to or lower than the predetermined value.

As a further preferred example, the carbon amount estimation unit repeatedly performs the estimation of the amount of the carbon, and stores the amount of the carbon estimated last time so as to perform the estimation of the amount of the carbon by using the stored amount of the carbon estimated the last time, and the carbon amount estimation unit sets a maximum amount of the carbon deposited in the carrier retention unit to the amount of the carbon estimated the last time so as to perform the estimation, when the stored amount of the carbon estimated the last time is cleared.

According to the example, when the stored amount of the carbon estimated the last time is cleared, it is possible to certainly prevent an incorrect determination of the insulation resistance of the carrier retention unit. For example, it is possible to prevent such an incorrect determination that the amount of the carbon deposited in the carrier retention unit is smaller than the predetermined amount even though the amount of the carbon deposited in the carrier retention unit is actually larger than the predetermined amount. Therefore, it becomes possible to appropriately prevent the electrical leak of the electrically heated catalyst.

In another manner, the above vehicle control device further includes a unit which performs a control of operating the internal combustion engine when the applying current prohibition unit prohibits applying the current to the electrically heated catalyst, and performs a control of continuing the operation of the internal combustion engine so that the carbon deposited in the carrier retention unit is burned down.

According to the manner, when the applying current prohibition unit prohibits applying the current to the electrically heated catalyst, the unit performs the control of operating the internal combustion engine in order to warm the catalyst, and performs the control of continuing the operation of the internal combustion engine so that the carbon deposited in the carrier retention unit is burned down. For example, after the catalyst is warmed by the operation of the internal combustion engine, the operation of the internal combustion engine is continued until the carbon deposited in the carrier retention unit is burned down. Therefore, since there is a substantially high possibility that the amount of the carbon deposited in the carrier retention unit is lower than the predetermined amount when the request for applying the current to the electrically heated catalyst is issued next time, the possibility that the current can be applied to the electrically heated catalyst increases. Thereby, it is possible to decrease the frequency of the start of the internal combustion engine, and hence it becomes possible to suppress the deterioration of the drivability and to improve the fuel consumption.

BRIEF DESCRIPTION OF THE DRAWINGS

FIG. 9 is a flow chart showing an estimation process of a retention mat temperature in a first embodiment.

DETAILED DESCRIPTION OF THE PREFERRED EMBODIMENTS

Preferred embodiments of the present invention will be explained hereinafter with reference to the drawings.

[Device Configuration]

Figure 1:
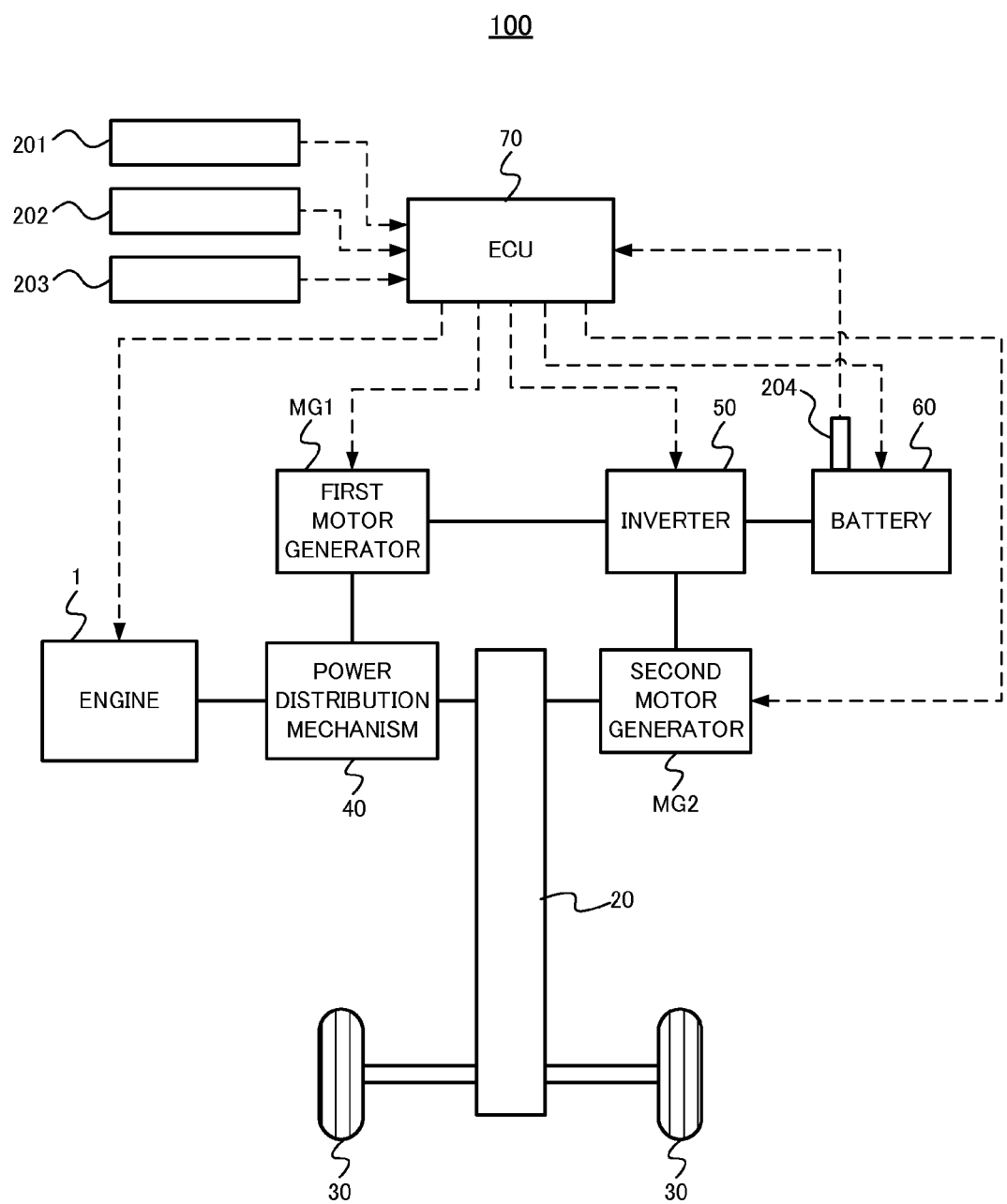
FIG. 1 shows a schematic configuration of a hybrid vehicle.

FIG. 1 shows a schematic configuration of a hybrid vehicle 100 in the embodiment. In FIG. 1, broken arrows show the input/output of signals.

The hybrid vehicle 100 mainly includes an engine (internal combustion engine) 1, an axle 20, wheels 30, a first motor generator MG1, a second motor generator MG2, a power distribution mechanism 40, an inverter 50, a battery 60 and an ECU (Electronic Control Unit) 70.

The axle 20 is a part of a power transmission system which transmits the power of the engine 1 and the second motor generator MG2 to the wheels 30. The wheels 30 are the wheels of the hybrid vehicle 100, and FIG. 1 especially shows only the right and left front wheels to simplify the explanation. The engine 1 is a gasoline engine, for example, and functions as a power source for outputting major driving force of the hybrid vehicle 100. For the engine 1, various controls are performed by the ECU 70.

The first motor generator MG1 is configured to function as a generator to mainly charge the battery 60 or a generator to supply the electric power to the second motor generator MG2, and performs the electric generation by the output of the engine 1. The second motor generator MG2 is configured to function as a generator to mainly assist the output of the engine 1. The motor generators MG1 and MG2 are configured as a synchronous motor generator, for example, and include a rotor having plural permanent magnets on the outer circumferential surface and a stator around which three-phase coils are wound.

The power distribution mechanism 40 corresponds to the planetary gear having a sun gear and a ring gear, and is configured to distribute the output of the engine 1 to the first motor generator MG1 and the axle 20.

The inverter 50 is a DC/AC converter which controls the input/output of the electric power between the battery 60 and the first motor generator MG1, and controls the input/output of the electric power between the battery 60 and the second motor generator MG2. For example, the inverter 50 converts the AC electric power generated by the first motor generator MG1 to the DC electric power and supplies it to the battery 60. Additionally, the inverter 50 converts the DC electric power taken out from the battery 60 to the AC electric power and supplies it to the second motor generator MG2.

The battery 60 is configured to function as a power supply to drive the first motor generator MG1 and/or the second motor generator MG2, and to charge the electric power generated by the first motor generator MG1 and/or the second motor generator MG2. The battery 60 is provided with a SOC sensor 204 capable of detecting a state of charge (SOC) of the battery 60. The SOC sensor 204 provides the ECU 70 with a detection signal corresponding to the detected SOC.

In the following description, the expression of "motor generator MG" is used when the first motor generator MG1 and the second motor generator MG2 are not discriminated from each other.

The ECU 70 includes a CPU (Central Processing Unit), a ROM (Read Only Memory) and a RAM (Random Access Memory), and executes various controls to each constitutional elements in the hybrid vehicle 100. For example, the ECU 70 performs a control based on an accelerator opening degree detected by an accelerator opening degree sensor 201, a vehicle speed detected by a vehicle speed sensor 202 and an outside air-temperature detected by an outside air-temperature sensor 203. As described later in detail, the ECU 70 corresponds to an example of the insulation resistance determination unit and the applying current prohibition unit in the present invention.

Figure 2:
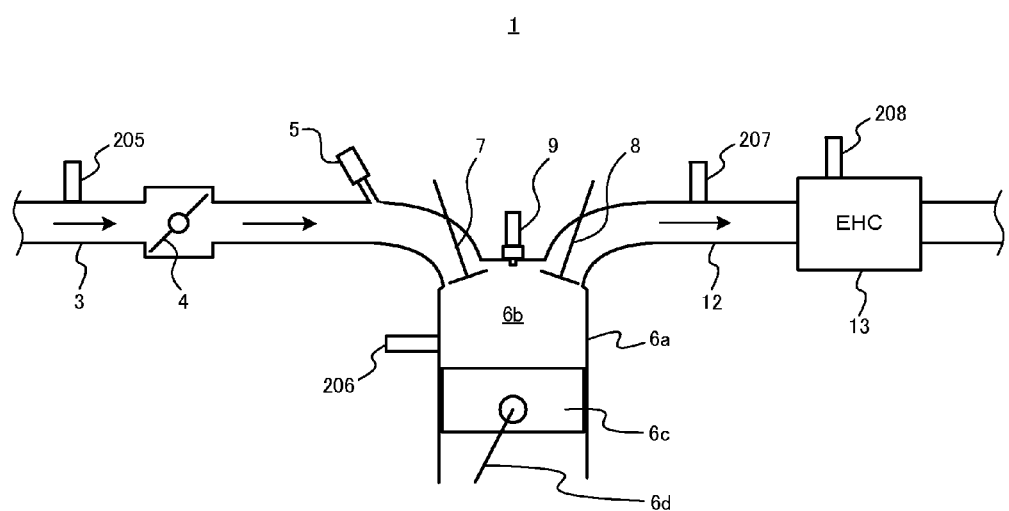
FIG. 2 shows a schematic configuration of an engine.

Next, a concrete description will be given of the engine 1, with reference to FIG. 2. FIG. 2 shows a schematic configuration of the engine 1.

The engine mainly includes an intake air passage 3, a throttle valve 4, a fuel injection valve 5, a cylinder 6a, an intake valve 7, an exhaust valve 8, a spark plug 9, an exhaust passage 12 and an EHC (electrically heated catalyst) 13. Though only one cylinder 6a is shown in FIG. 2 to simplify the explanation, the engine 1 actually includes plural cylinders 6a.

The intake air from the outside passes through the intake air passage 3, and the throttle valve 4 adjusts the flow amount of the gas passing through the intake air passage 3. The intake air passing through the intake air passage 3 is supplied to a combustion chamber 6b. The combustion chamber 6b is supplied with the fuel injected by the fuel injection valve 5, too. The intake valve 7 and the exhaust valve 8 are provided on the combustion chamber 6b. By opening and closing the intake valve 7, the flow and cutoff of the intake air in the intake air passage 3 is switched. By opening and closing the exhaust valve 8, the flow and cutoff of the exhaust gas in the exhaust passage 12 is switched.

In the combustion chamber 6b, the fuel-air mixture of the intake air and the fuel burns by the ignition of the spark plug 9. For the spark plug 9, the ECU 70 performs the control of the ignition timing. The piston 6c is reciprocated by the burning, and the reciprocation is transmitted to a crank axis (which is not shown) via the con rod 6d. As a result, the crank axis rotates. The exhaust gas generated by the burning in the combustion chamber 6b is discharged to the exhaust passage 12.

The exhaust passage 12 is provided with the EHC 13 which purifies the exhaust gas and is warmed by applying the current. The EHC 13 will be described in details, later. Another catalyst (for example, three-way catalyst) may be provided on the exhaust passage 12 at the downstream position of the EHC 13.

Additionally, the engine 1 is provided with various sensors. An air flow meter 205 is provided on the intake air passage 3 and detects an intake air amount. A water temperature sensor 206 is provided on a passage in which cooling water for cooling the engine 1 flows, and detects a temperature of the cooling water (hereinafter referred to as "engine water temperature"). An air-fuel ratio sensor 207 is provided on the exhaust passage 12, and detects an air-fuel ratio (A/F) of the exhaust gas. A floor temperature sensor 208 detects a temperature of the EHC 13, or a floor temperature (hereinafter referred to as "EHC floor temperature") of the catalyst in the EHC 13. For example, the floor temperature sensor 208 is provided on the EHC carrier (which is not shown) in the EHC 13. These sensors provide the detection signals to the ECU 70.

Figure 3A:
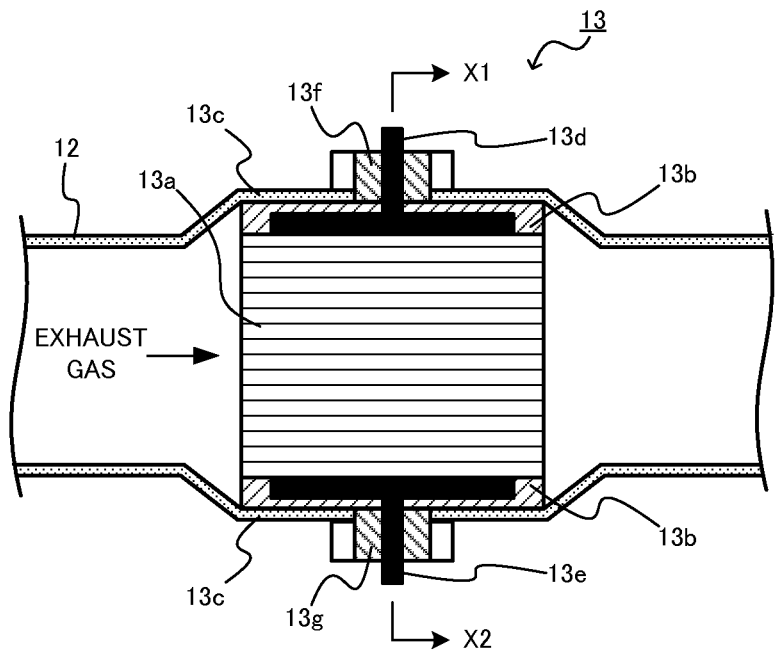
FIGS. 3A and 3B show schematic configurations of an EHC.
Figure 3B:
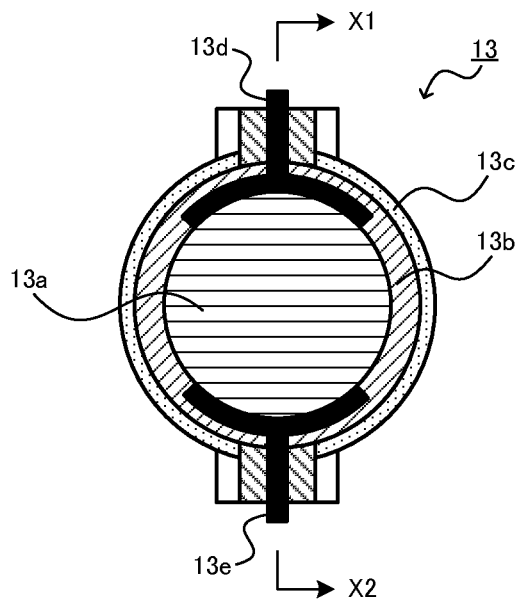

Next, a concrete description will be given of the EHC 13, with reference to FIGS. 3A and 3B. FIGS. 3A and 3B show schematic configurations of the EHC 13.

FIG. 3A shows a cross-sectional view of the EHC 13 along a longitudinal direction of the exhaust passage 12. FIG. 3B shows a cross-sectional view of the EHC 13 along a line X1-X2 in FIG. 3A. As shown in FIGS. 3A and 3B, the EHC 13 includes an EHC carrier 13a, a retention mat 13b, a case 13c, a positive electrode 13d, a negative electrode 13e and insulators 13f and 13g.

The EHC carrier 13a has a honeycombed cross-section, and supports the catalyst. For example, the EHC carrier 13a is formed by SiC (silicon dioxide). The EHC carrier 13a has the conductive property. The EHC carrier 13a corresponds to an example of the catalyst carrier.

The retention mat 13b is positioned to cover the outer periphery of the EHC carrier 13a and the inner periphery of the case 13c, and retains the EHC carrier 13a. The retention mat 13b is formed by interweaving the fibrous metallic oxide such as alumina, and has the electrical insulation property. Additionally, the retention mat 13b has the thermal insulation property. The retention mat 13b corresponds to an example of the carrier retention unit.

The case 13c is a chassis of the EHC 13 which is formed by the metallic material such as SUS. The case 13c is connected to the exhaust passage 12 via a connection member (which is not shown) at the upstream and downstream ends.

The positive electrode 13d is an electrode for applying the positive voltage, and the end of the positive electrode 13d is fixed on the periphery of the EHC carrier 13a. The negative electrode 13e is an electrode for applying the negative voltage, and the end of the negative electrode 13e is fixed on the periphery of the EHC carrier 13a. The positive electrode 13d and the negative electrode 13e are covered by the insulators 13f and 13g which are formed by the insulation material such as alumina, so as to maintain the electrically insulated condition.

As for the above EHC 13, when the positive voltage based on the potential of the negative electrode 13e is applied to the positive electrode 13d, the current flows through the EHC carrier 13a having the conductive material, and the EHC carrier 13a generates the heat. By the heat, the temperature of the catalyst supported by the EHC carrier 13a increases, and the catalyst immediately makes the transition to a catalyst activated state. The above configuration of the EHC 13 is an example. Various heretofore known manners can be applied to the configuration of the EHC carrier, the setting manner of each electrode and the control manner, for example.

Here, the above ECU 70 performs a control for warming the EHC 13 (namely, catalyst warming control). Concretely, the ECU 70 performs a control of heating the catalyst by applying the current to the EHC 13, or a control of heating the catalyst by the exhaust gas of the engine 1. Hereinafter, the control of heating the catalyst by applying the current to the EHC 13 is referred to as "catalyst warming by applying current", and the control of heating the catalyst by the exhaust gas of the engine 1 is referred to as "catalyst warming by engine". Specifically, when the EHC floor temperature is equal to or lower than a predetermined temperature, the ECU 70 performs the catalyst warming by applying the current or the catalyst warming by the engine 1, so as to maintain the EHC floor temperature equal to or higher than a temperature (namely, activating temperature) at which the catalyst in the EHC 13 exerts an optimum exhaust purification performance. Hereinafter, the predetermined temperature used for the determination of the EHC floor temperature is suitably referred to as "catalyst warming determination temperature". The catalyst warming determination temperature is set based on the activating temperature of the catalyst in the EHC 13. Basically, when the EHC floor temperature is equal to or lower than the catalyst warming determination temperature, the ECU 70 issues a request for applying the current to the EHC 13 for the purpose of the catalyst warming (hereinafter, the request is referred to as "request for applying current to EHC").

When the catalyst warming by applying the current is performed, the ECU 70 performs the control of making the hybrid vehicle 100 travel by using the output of the engine 1, for example. In contrast, when the catalyst warming by the engine 1 is performed, the ECU 70 performs the control of making the hybrid vehicle 100 travel by using the output of the motor generator MG, for example. Namely, a so-called "EV traveling" is performed. In this case, while the ECU 70 makes the engine 1 perform a driving corresponding to an idling driving, for example, the ECU 70 performs a control of delaying the ignition timing so as to increase the exhaust gas temperature.

[Basic Concept of Control Method]

Next, a description will be given of a basic concept of a control method performed by the ECU 70 in the embodiment.

In the embodiment, the ECU 70 determines whether or not the insulation property of the EHC 13 is ensured based on the insulation resistance of the retention mat 13b in the EHC 13, and determines the permission or prohibition of applying the current to the EHC 13. Namely, the ECU 70 determines whether or not to perform the catalyst warming by applying the current. Concretely, the ECU 70 determines whether or not the insulation resistance of the retention mat 13b decreases to the value equal to or lower than a predetermined value by using a predetermined condition, and prohibits applying the current to the EHC 13 when the insulation resistance decreases to the value equal to or lower than the predetermined value. Even if the request for applying the current to the EHC 13 is issued for the purpose of the catalyst warming, since it can be said that the insulation property of the retention mat 13b is not ensured when the insulation resistance of the retention mat 13b decreases to the value equal to or lower than the predetermined value, the ECU 70 prohibits performing the catalyst warming by applying the current.

Here, such a condition that the insulation resistance of the retention mat 13b decreases to the value equal to or lower than the predetermined value indicates such a condition that the electrical leak certainly occurs as an actual phenomenon when the current is applied to the EHC 13, or such a condition that the occurrence of the electrical leak is estimated or predicted, or such a condition that it can be determined that a possibility of the occurrence of the electrical leak is higher than a possibility to be able to permit as a practical matter. The predetermined value for determining the insulation resistance is set based on that standpoint. Concretely, the predetermined value is set to such a value that the insulation property of the retention mat 13b cannot be ensured when the insulation resistance is equal to or lower than the value. Hereinafter, the predetermined value is referred to as "insulation resistance lower limit ensured value".

Additionally, in the embodiment, without directly monitoring the insulation resistance of the retention mat 13b, the ECU 70 estimates the insulation resistance of the retention mat 13b based on a parameter corresponding to the insulation resistance of the retention mat 13b (namely, the parameter which affects the insulation resistance of the retention mat 13b). This is because, when a sensor which directly detects the insulation resistance is used, depending on an electricity supply system driving the sensor, there is a possibility that the insulation resistance cannot be constantly monitored by turning off the system, for example. Therefore, in the embodiment, the ECU 70 estimates the insulation resistance based on the parameter which affects the insulation resistance, so as to appropriately predict the electrical leak of the EHC 13.

Hereinafter, a description will be given of concrete embodiments (first to third embodiments) according to the above control method.

[First Embodiment]

In a first embodiment, the ECU 70 estimates the insulation resistance of the retention mat 13b based on a temperature (hereinafter referred to as "retention mat temperature") of the retention mat 13b, and determines the permission or prohibition of applying the current to the EHC 13. This is because the insulation resistance of the retention mat 13b tends to change by the retention mat temperature. Concretely, in the first embodiment, when the retention mat temperature is equal to or higher than a predetermined temperature, the ECU 70 determines that the insulation resistance of the retention mat 13b decreases to the value equal to or lower than the predetermined value, and prohibits applying the current to the EHC 13. In this case, even if the request for applying the current to the EHC 13 is issued, the ECU 70 does not perform the catalyst warming by applying the current.

A concrete description will be given of a reason for controlling the current applied to the EHC 13 based on the retention mat temperature, with reference to FIG. 4 and FIG. 5.

Figure 4:
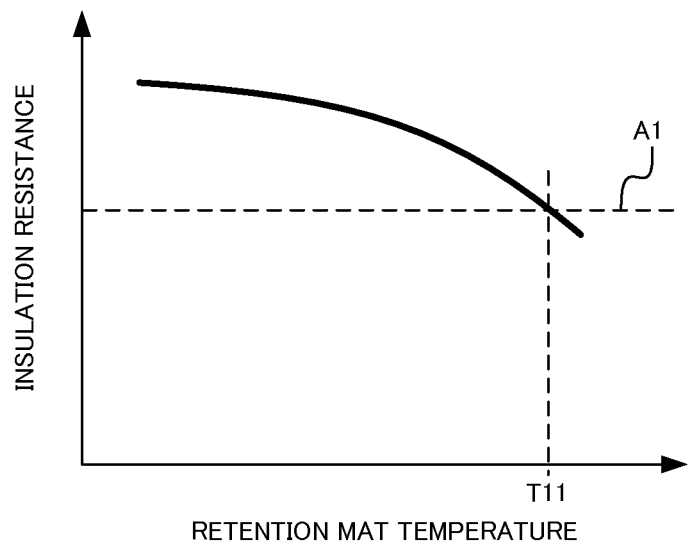
FIG. 4 shows an example of a relationship between a retention mat temperature and an insulation resistance of a retention mat.

FIG. 4 shows an example of a relationship between the retention mat temperature and the insulation resistance of the retention mat 13b. In FIG. 4, a horizontal axis shows the retention mat temperature, and a vertical axis shows the insulation resistance (corresponding to a volume intrinsic resistivity). The relationship between the retention mat temperature and the insulation resistance is obtained by preliminarily performing an experiment. Here, "insulation resistance" is represented by a numerical value corresponding to an insulation property between electrical circuits or between an electrical circuit and earth. When the numerical value of the insulation resistance becomes lower, an electrical leak tends to occur.

As shown in FIG. 4, when the temperature becomes higher, the insulation resistance tends to decrease due to the property of the alumina of the retention mat 13b, for example. Therefore, during a high speed driving and a high load driving in which the exhaust gas temperature becomes higher, the insulation resistance of the retention mat 13b tends to decrease due to the high-temperature retention mat 13b.

Additionally, in FIG. 4, a reference numeral A1 indicates the insulation resistance lower limit ensured value. When the retention mat temperature becomes higher than a temperature T11, the insulation resistance becomes lower than the insulation resistance lower limit ensured value A1. Namely, when the retention mat temperature becomes higher than the temperature T11, it can be said that the insulation property of the retention mat 13b cannot be ensured. Hereinafter, the retention mat temperature T11 corresponding to the insulation resistance lower limit ensured value A1 is referred to as "insulation ensured temperature". For example, the insulation ensured temperature is set to a temperature which is higher than the catalyst warming determination temperature. As an example, the catalyst warming determination temperature is set to 350 degrees Celsius, and the insulation ensured temperature is set to 500 degrees Celsius.

Figure 5:
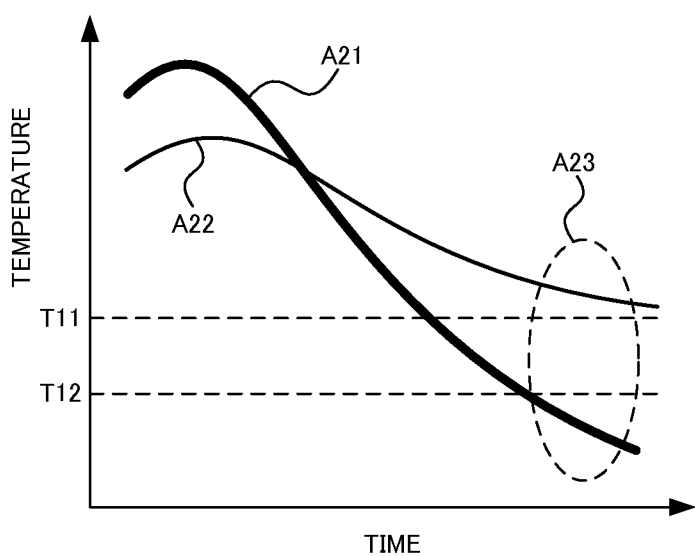
FIG. 5 shows an example of a temperature profile of an EHC floor temperature and a retention mat temperature.

FIG. 5 shows an example of a temperature profile of the EHC floor temperature and the retention mat temperature. In FIG. 5, a horizontal axis shows time, and a vertical axis shows a temperature. A graph A21 shows a time change of the EHC floor temperature, and a graph A22 shows a time change of the retention mat temperature. As shown by the graphs A21 and A22, it can be understood that both the EHC floor temperature and the retention mat temperature significantly decrease. For example, during a deceleration F/C (fuel cut), the above decreases in the EHC floor temperature and the retention mat temperature occur. In this case, it can be understood that the thermal difference between the EHC floor temperature and the retention mat temperature is generated. This is caused by a heat transfer at a boundary between the EHC carrier 13a and the retention mat 13b and a heat conduction in the retention mat 13b. Additionally, it can be understood that the change of the retention mat temperature is slower than the change of the EHC floor temperature. In other words, a time constant of the retention mat temperature is larger than that of the EHC floor temperature. This is caused by a heat capacity of each component in the EHC 13.

Additionally, in FIG. 5, the temperature T12 indicates the catalyst warming determination temperature, and the temperature T11 indicates the insulation ensured temperature. In this case, as shown by an area A23 represented by a broken line, it can be understood that such a state that the EHC floor temperature is lower than the catalyst warming determination temperature T12 and the retention mat temperature is higher than the insulation ensured temperature T11 occurs. In the state, though the EHC floor temperature is lower than the catalyst warming determination temperature T12 and the request for applying the current to the EHC 13 is issued, since the retention mat temperature is higher than the insulation ensured temperature T11, it can be said that the current should not be applied to the EHC 13 from the viewpoint of the insulation property of the EHC 13.

Thus, in the first embodiment, when the retention mat temperature is equal to or higher than the predetermined temperature, the ECU 70 determines that the insulation resistance of the retention mat 13b decreases to the value equal to or lower than the predetermined value (i.e. insulation resistance lower limit ensured value), and prohibits applying the current to the EHC 13.

(Determination of EHC Warming)

Next, a concrete description will be given of a determination of an EHC warming in the first embodiment. The determination of the EHC warming is performed in order to determine whether or not to warm the EHC 13, and in order to determine whether to perform the catalyst warming by the engine 1 or the catalyst warming by applying the current at the time of warming the EHC 13 (The same will apply hereinafter.).

Figure 6:
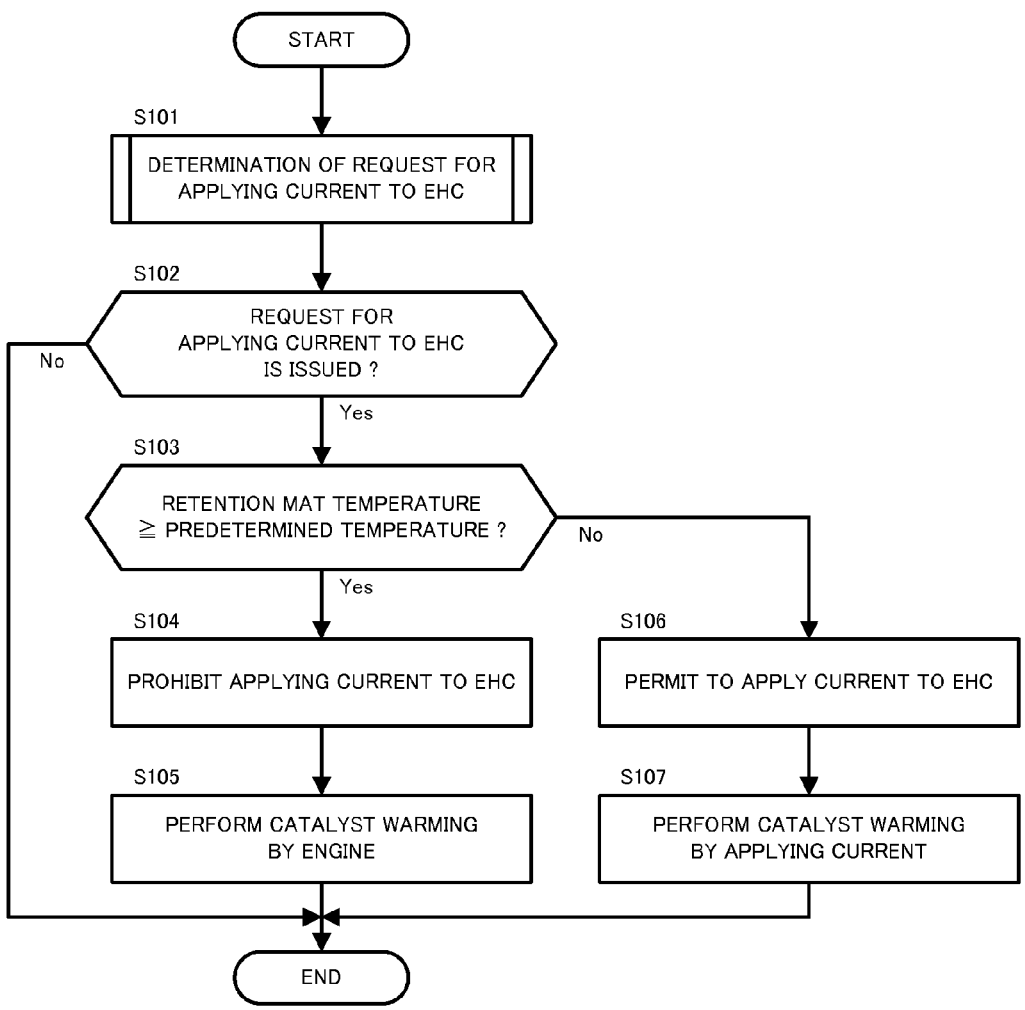
FIG. 6 is a flow chart showing a determination process of an EHC warming in a first embodiment.

FIG. 6 is a flow chart showing a determination process of the EHC warming in the first embodiment. The process is repeatedly executed by the ECU 70 in a predetermined cycle.

First, in step S101, the ECU 70 performs a determination (hereinafter referred to as "determination of request for applying current to EHC") related to the request for applying the current to the EHC 13, and the process goes to step S102.

Figure 7:
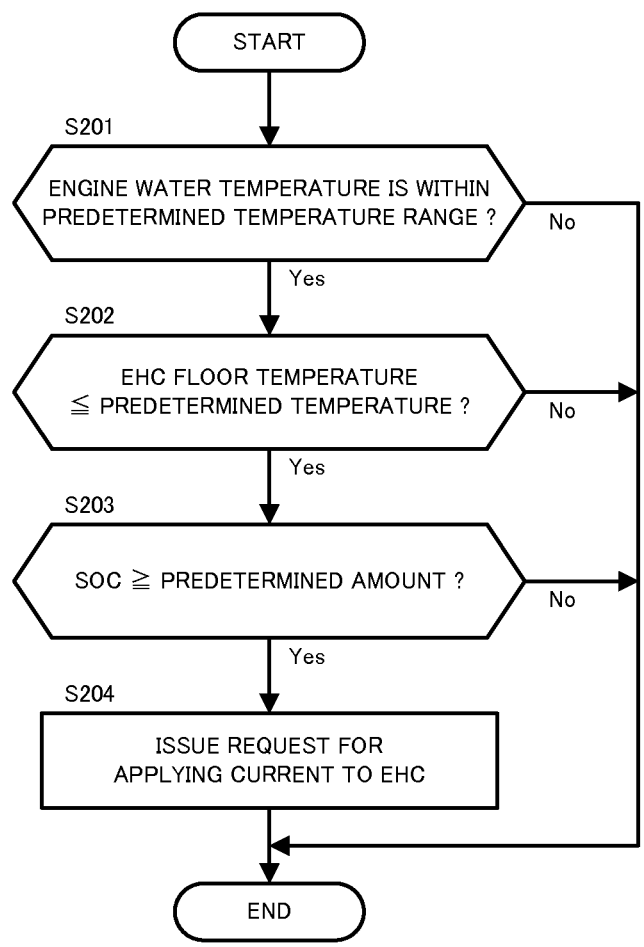
FIG. 7 is a flow chart showing a determination process of a request for applying a current to an EHC.

Here, a concrete description will be given of the determination of the request for applying the current to the EHC 13 performed in step S101, with reference to FIG. 7. FIG. 7 is a flow chart showing a determination process of the request for applying the current to the EHC 13. The determination process of the request for applying the current to the EHC 13 is performed in order to determine the request for applying the current to the EHC 13 for the purpose of the catalyst warming. The process is executed by the ECU 70, too.

In step S201, the ECU 70 obtains the engine water temperature detected by the water temperature sensor 206, and determines whether or not the engine water temperature is within a predetermined temperature range. In step S201, the ECU 70 determines whether or not the present state is such an engine state that the current can be applied to the EHC 13. When the engine water temperature is within the predetermined temperature range (step S201: Yes), the process goes to step S202. In contrast, when the engine water temperature is not within the predetermined temperature range (step S201: No), since it can be said that the present state is not such an engine state that the current can be applied to the EHC 13, the process ends. In this case, the ECU 70 does not issue the request for applying the current to the EHC 13.

It is not limited to perform the determination in step S201 based on the engine water temperature. Instead of using the engine water temperature, the determination may be performed by using the outside air-temperature. Or, the determination may be performed by using both of the engine water temperature and the outside air-temperature.

In step S202, the ECU 70 obtains the EHC floor temperature detected by the floor temperature sensor 208, and determines whether or not the EHC floor temperature is equal to or lower than a predetermined temperature. In step S202, the ECU 70 determines whether or not the state of the EHC 13 is no activated state. Concretely, by using the catalyst warming determination temperature as the predetermined temperature, the ECU 70 determines whether or not the EHC floor temperature is equal to or lower than the catalyst warming determination temperature. When the EHC floor temperature is equal to or lower than the predetermined temperature (step S202: Yes), since the state of the EHC 13 is no activated state, the process goes to step S203. In contrast, when the EHC floor temperature is not equal to or lower than the predetermined temperature (step S202: No), since the state of the EHC 13 is the activated state, the process ends. In this case, the ECU 70 does not issue the request for applying the current to the EHC 13.

It is not limited to perform the determination in step S202 based on the EHC floor temperature detected by the floor temperature sensor 208. Instead of the EHC floor temperature detected by the floor temperature sensor 208, the determination in step S202 may be performed based on the EHC floor temperature estimated by the exhaust gas temperature. Namely, it is not limited that an actual measured value is used as the EHC floor temperature. As another example, an estimated value may be used as the EHC floor temperature.

In step S203, the ECU 70 obtains the SOC of the battery 60 detected by the SOC sensor 204, and determines whether or not the SOC is equal to or larger than a predetermined amount. In step S203, the ECU 70 determines whether or not an electricity amount needed to apply the current to the EHC 13 remains in the battery 60. When the SOC is equal to or larger than the predetermined amount (step S203: Yes), the process goes to step S204. In this case, since the electricity amount needed to apply the current to the EHC 13 remains, the ECU 70 issues the request for applying the current to the EHC 13. Then, the process ends. In contrast, when the SOC is not equal to or larger than the predetermined amount (step S203: No), since the electricity amount needed to apply the current to the EHC 13 does not remain, the process ends. In this case, the ECU 70 does not issue the request for applying the current to the EHC 13.

By going back to FIG. 6, a description will be given of processes after step S102. In step S102, the ECU 70 determines whether or not the request for applying the current to the EHC 13 is issued. When the request for applying the current to the EHC 13 is issued (step S102: Yes), the process goes to step S103. When the request for applying the current to the EHC 13 is not issued (step S102: No), the process ends.

In step S103, the ECU 70 determines whether or not the retention mat temperature is equal to or higher than a predetermined temperature. In step S103, based on the retention mat temperature, the ECU 70 determines whether or not the present state is such a state that the insulation resistance of the retention mat 13b decreases to the value equal to or lower than the insulation resistance lower limit ensured value. Namely, based on the retention mat temperature, the ECU 70 determines whether or not the present state is such a state that the insulation property of the retention mat 13b is not ensured. As an example, the ECU 70 performs the determination in step S103 by using a value (actual measured value) detected by a sensor as the retention mat temperature. In the example, the ECU 70 uses a temperature detected by a sensor provided on the retention mat 13b, for example. As another example, the ECU 70 performs the determination in step S103 by using a value (estimated value) estimated based on a predetermined parameter. A method for estimating the retention mat temperature will be described in details, later.

Here, the predetermined temperature used in step S103 is set based on the relationship between the retention mat temperature and the insulation resistance of the retention mat 13b (see FIG. 4). Concretely, the relationship between the retention mat temperature and the insulation resistance is obtained by an experiment, and the insulation ensured temperature corresponding to the insulation resistance lower limit ensured value is obtained by the relationship, so as to set the predetermined temperature based on the obtained insulation ensured temperature. For example, the predetermined temperature is set to the insulation ensured temperature, or is set to a temperature which is lower than the insulation ensured temperature to some extent.

When the retention mat temperature is equal to or higher than the predetermined temperature (step S103: Yes), the process goes to step S104. In this case, it can be said that there is a high possibility that the insulation resistance of the retention mat 13b decreases to the value equal to or lower than the insulation resistance lower limit ensured value. Therefore, in step S104, the ECU 70 prohibits applying the current to the EHC 13. Then, the process goes to step S105, and the ECU 70 performs the catalyst warming by the engine 1. For example, the ECU 70 performs the control of operating the engine 1 so that the ignition timing is delayed. Then, the process ends.

Meanwhile, when the retention mat temperature is lower than the predetermined temperature (step S103: No), the process goes to step S106. In this case, it can be said that there is a substantially low possibility that the insulation resistance of the retention mat 13b decreases to the value equal to or lower than the insulation resistance lower limit ensured value. Therefore, in step S106, the ECU 70 permits to apply the current to the EHC 13. Then, the process goes to step S107, and the ECU 70 performs the catalyst warming by applying the current to the EHC 13. Afterward, the process ends.

By the above determination process of the EHC warming, it is possible to prohibit applying the current to the EHC 13 when the retention mat temperature is equal to or higher than the predetermined temperature, and hence it becomes possible to appropriately prevent the electrical leak of the EHC 13. Additionally, since the catalyst warming by the engine 1 is appropriately performed when the retention mat temperature is equal to or higher than the predetermined temperature, it becomes possible to warm the EHC 13. Namely, it becomes possible to appropriately prevent the electrical leak of the EHC 13, and to appropriately warm the EHC 13.

(Estimation of Retention Mat Temperature)

Next, a description will be given of an estimation method of the retention mat temperature in the first embodiment. The ECU 70 functions as the temperature estimation unit, and estimates the retention mat temperature in consideration of a heat transfer of the EHC carrier 13a, the retention mat 13b and the case 13c, respectively. Concretely, the ECU 70 estimates the retention mat temperature in consideration of a temperature difference of each component in the EHC 13 and a time delay of a heat transfer of each component in the EHC 13. The estimated retention mat temperature is used in the above determination in step S103 (see FIG. 6).

Figure 8A:
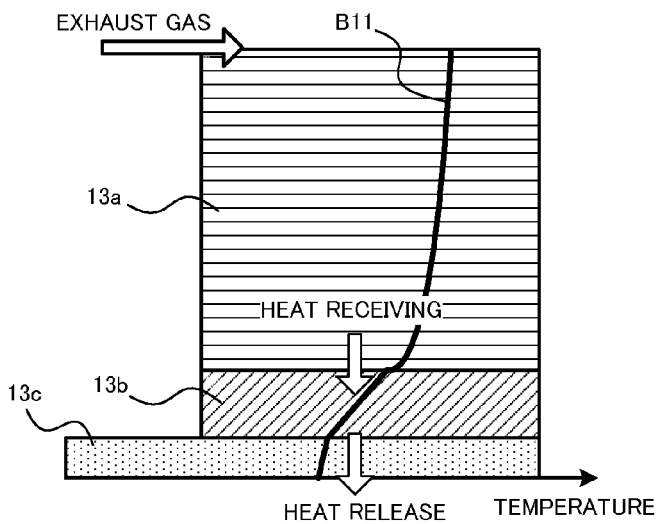
FIGS. 8A to 8C are diagrams for explaining an estimation method of a retention mat temperature.
Figure 8B:
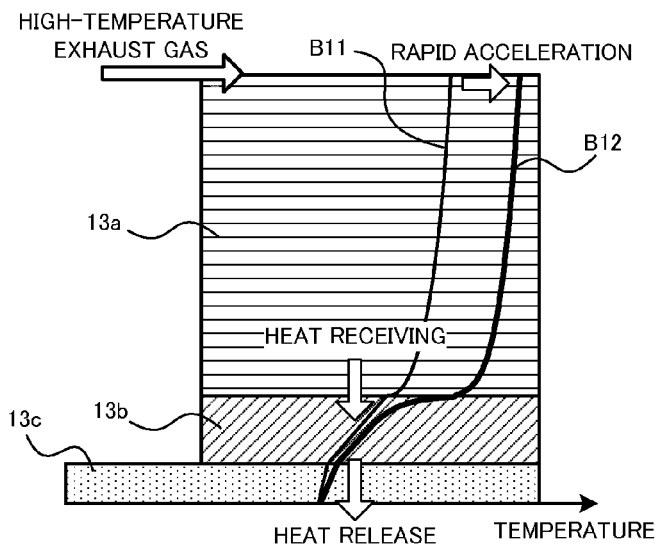
Figure 8C:
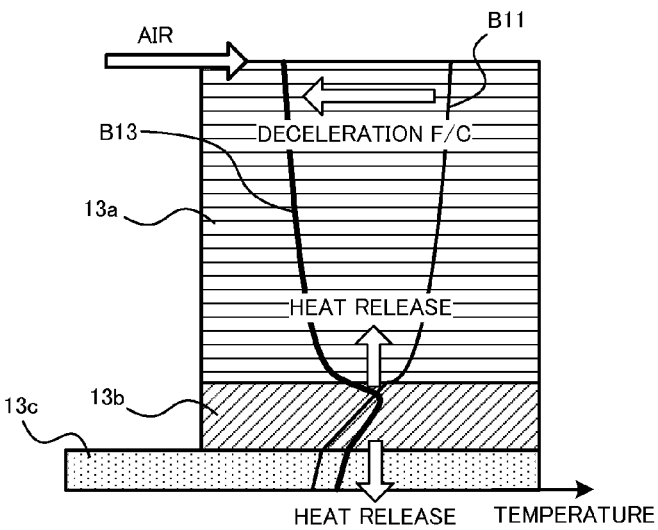

A concrete description will be given of the estimation method of the retention mat temperature, with reference to FIGS. 8A to 8C. In FIGS. 8A to 8C, horizontal directions show a temperature, and vertical directions show the EHC carrier 13a, the retention mat 13b and the case 13c. Hence, FIGS. 8A to 8C schematically represent the heat transfer in the EHC 13.

By a graph B11, FIG. 8A shows a temperature profile of the EHC carrier 13a, the retention mat 13b and the case 13c during a steady operation. In this case, the EHC carrier 13a receives the heat from the exhaust gas. Then, the retention mat 13b receives the heat from the EHC carrier 13a, and releases the heat to the case 13c. Therefore, the temperature difference between the EHC floor temperature and the retention mat temperature occurs (EHC floor temperature>retention mat temperature).

By a graph B12, FIG. 8B shows a temperature profile of the EHC carrier 13a, the retention mat 13b and the case 13c during a rapid acceleration. In FIG. 8B, for a comparison purpose, the temperature profile B11 during the steady operation is superimposed. During the rapid acceleration, the EHC carrier 13a receives the heat from the exhaust gas, and the retention mat 13b releases the heat received from the EHC carrier 13a to the case 13c, too. However, during the rapid acceleration, since the exhaust gas temperature becomes higher than that of the exhaust gas during the steady operation, the EHC carrier 13a is significantly heated by the exhaust gas. Therefore, the time delay of the heat transfer from the EHC carrier 13a to the retention mat 13b becomes larger.

By a graph B13, FIG. 8C shows a temperature profile of the EHC carrier 13a, the retention mat 13b and the case 13c during a deceleration F/C. In FIG. 8C, for a comparison purpose, the temperature profile B11 during the steady operation is superimposed. During the deceleration F/C, the EHC carrier 13a is cooled down by an air flow. Therefore, the retention mat 13b releases the heat to both the EHC carrier 13a and the case 13c. Hence, such a state that the retention mat temperature is higher than the EHC floor temperature occurs.

As described above, it can be said that the receiving heat and the releasing heat of the retention mat 13b during the rapid acceleration and the deceleration F/C is an unsteady heat transfer phenomenon. This is because the time delay of the heat transfer occurs in the EHC 13.

Thus, in the embodiment, the ECU 70 estimates the retention mat temperature in consideration of the temperature difference of each component in the EHC 13 and the time delay of the heat transfer of each component in the EHC 13. Concretely, the ECU 70 uses a temperature obtained by applying the time delay to the EHC floor temperature, as the retention mat temperature. Specifically, the ECU 70 represents the time delay of the change of the retention mat temperature with respect to the change of the EHC floor temperature by "smoothing coefficient", and calculates the retention mat temperature by multiplying the EHC floor temperature by the smoothing coefficient. For example, the smoothing coefficient is set by preliminarily performing an experiment or a simulation or a predetermined arithmetic expression. As an example, the ECU 70 calculates the smoothing coefficient with reference to a preliminarily prepared map, in which the smoothing coefficient is associated with parameters such as an operation state of the engine 1, an operation state of the vehicle and an outside state.

Next, a description will be given of a concrete process of the estimation of the retention mat temperature, with reference to FIG. 9. FIG. 9 is a flow chart showing an estimation process of the retention mat temperature in the first embodiment. The estimation process of the retention mat temperature is executed before step S103 in the above determination process of the EHC warming (see FIG. 6). Additionally, the process is executed by the ECU 70.

First, in step S301, the ECU 70 obtains the EHC floor temperature detected by the floor temperature sensor 208. It is not limited to use the EHC floor temperature detected by the floor temperature sensor 208. An EHC floor temperature estimated by the exhaust gas temperature may be used.

In parallel with the process in step S301, the processes in steps S302 to S304 are performed. In step S302, the ECU 70 obtains information related to the engine 1 and the hybrid vehicle 100. For example, the ECU 70 obtains the intake air amount detected by the air flow meter 205, the air-fuel ratio detected by the air-fuel ratio sensor 207, the vehicle speed detected by the vehicle speed sensor 202 and the engine water temperature detected by the water temperature sensor 206. Then, the process goes to step S303. In step S303, the ECU 70 obtains outside information of the hybrid vehicle 100. For example, the ECU 70 obtains the outside air-temperature detected by the outside air-temperature sensor 203. Then, the process goes to step S304.

In step S304, the ECU 70 calculates the smoothing coefficient based on the information obtained in steps S302 and S303. For example, the ECU 70 obtains the smoothing coefficient corresponding to the information obtained in steps S302 and S303, with reference to the map in which the smoothing coefficient is associated with the information related to the engine 1 and the hybrid vehicle 100 and the outside information. The map is prepared by preliminarily performing an experiment or a simulation. It is not limited that the smoothing coefficient is obtained by using the map. The smoothing coefficient may be calculated by performing a predetermined arithmetic expression. When the process in step S304 ends, the process goes to step S305.

In step S305, the ECU 70 estimates the retention mat temperature based on the EHC floor temperature obtained in step S301 and the smoothing coefficient obtained in step S304. Concretely, the ECU 70 calculates the retention mat temperature by multiplying the EHC floor temperature by the smoothing coefficient. Then, the process ends.

By the estimation process of the retention mat temperature, it is possible to accurately estimate the retention mat temperature. Therefore, in the above determination process of the EHC warming, it becomes possible to accurately perform the determination using the retention mat temperature (step S103). Concretely, based on the retention mat temperature, it becomes possible to accurately determine whether or not the insulation resistance of the retention mat 13b decreases to the value equal to or lower than the predetermined value.

[Second Embodiment]

Next, a description will be given of a second embodiment. The second embodiment is different from the first embodiment in that the insulation resistance of the retention mat 13b is estimated based on an amount of water absorbed by the retention mat 13b (In other words, the amount corresponds to an amount of exhaust condensate water retained by the retention mat 13b. Hereinafter, the amount is referred to as "mat water-absorption amount"). Namely, the second embodiment is different from the first embodiment in that the permission or prohibition of applying the current to the EHC 13 is determined based on the mat water-absorption amount instead of the retention mat temperature. Concretely, in the second embodiment, when the mat water-absorption amount is equal to or larger than a predetermined amount, the ECU 70 determines that the insulation resistance of the retention mat 13b decreases to the value equal to or lower than the predetermined value, and prohibits applying the current to the EHC 13.

The reason for performing the above control based on the mat water-absorption amount is as follows. Basically, the water generated by burning the fuel is included in the exhaust gas. In such a case that the exhaust gas temperature or the temperature of the exhaust passage 12 (exhaust passage temperature) is low, the water vapor in the exhaust gas condenses when the exhaust gas contacts the exhaust passage 12, and the water (condensate water) accumulates in the exhaust passage 12.

Meanwhile, the retention mat 13b in the EHC 13 absorbs the above condensate water. Namely, by the condensate water in the exhaust passage 12, the retention mat 13b is soaked in the water. When the retention mat 13b absorbs the condensate water, the insulation resistance of the retention mat 13b tends to decrease. Concretely, when the mat water-absorption amount becomes larger, the insulation resistance tends to decrease. When the retention mat 13b is heated to the high temperature, the condensate water absorbed by the retention mat 13b is evaporated and removed.

Thus, in the second embodiment, when the mat water-absorption amount is equal to or larger than the predetermined amount, the ECU 70 determines that the insulation resistance of the retention mat 13b decreases to the value equal to or lower than the predetermined value (namely, insulation resistance lower limit ensured value), and prohibits applying the current to the EHC 13. In this case, even if the request for applying the current to the EHC 13 is issued for the purpose of the catalyst warming, the ECU 70 does not perform the catalyst warming by applying the current.

(Determination of EHC Warming)

Figure 10:
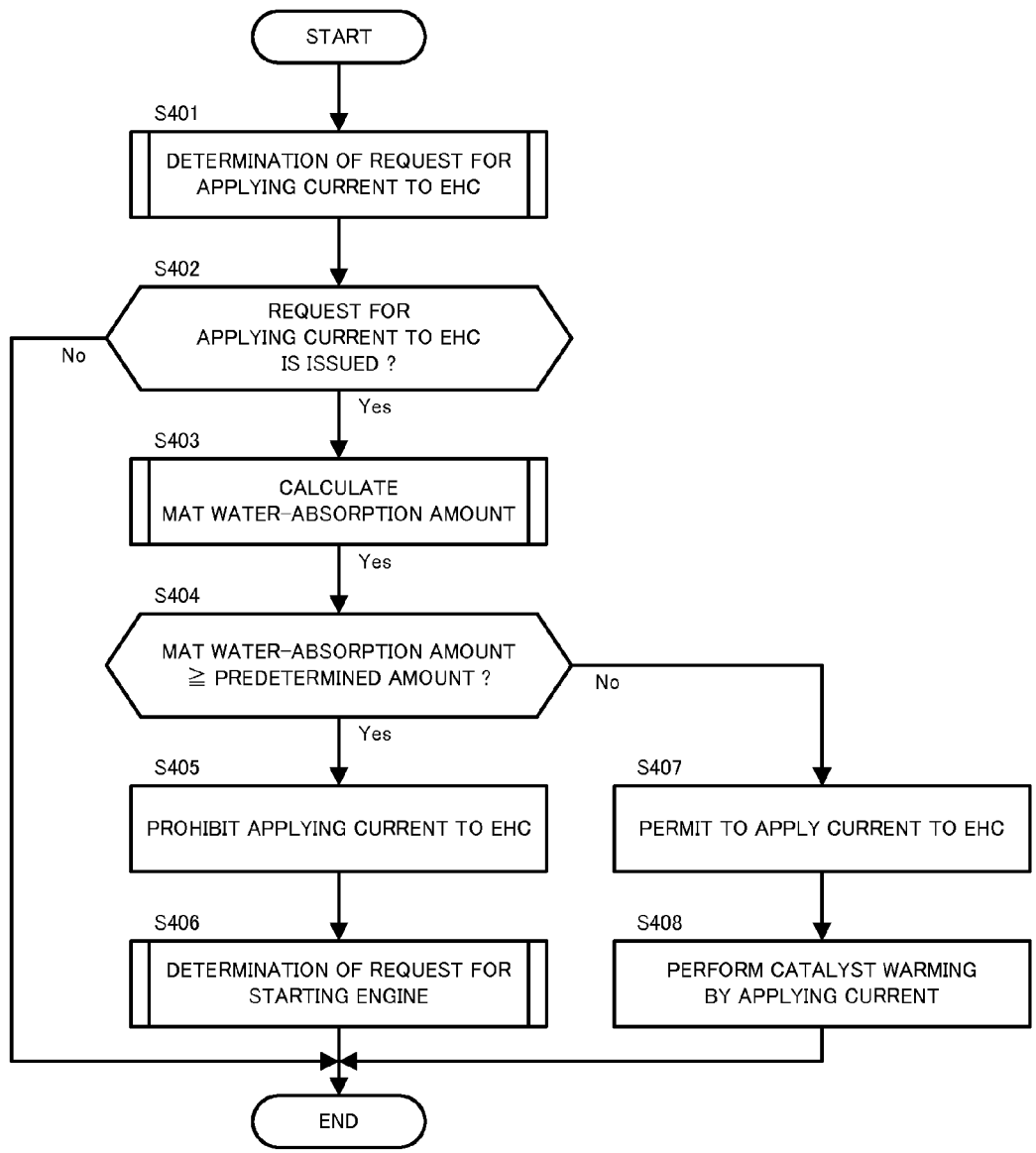
FIG. 10 is a flow chart showing a determination process of an EHC warming in a second embodiment.

Next, a concrete description will be given of a determination of the EHC warming in the second embodiment. FIG. 10 is a flow chart showing a determination process of the EHC warming in the second embodiment. The process is repeatedly executed by the ECU 70 in a predetermined cycle.

First, in step S401, the ECU 70 performs the determination of the request for applying the current to the EHC 13. Concretely, the ECU 70 performs the determination of the request for applying the current to the EHC 13 similar to step S101 in FIG. 6. Namely, the ECU 70 performs the determination process of the request for applying the current to the EHC 13 as shown in FIG. 7. So, explanations thereof are omitted. Then, the process goes to step S402.

In step S402, the ECU 70 determines whether or not the request for applying the current to the EHC 13 is issued. When the request for applying the current to the EHC 13 is issued (step S402: Yes), the process goes to step S403. When the request for applying the current to the EHC 13 is not issued (step S402: No), the process ends.

In step S403, the ECU 70 calculates the mat water-absorption amount. Then, the process goes to step S404. A method for calculating the mat water-absorption amount will be described in details, later.

In step S404, the ECU 70 determines whether or not the mat water-absorption amount is equal to or larger than the predetermined amount. In step S404, based on the mat water-absorption amount, the ECU 70 determines whether or not the present state is such a state that the insulation resistance of the retention mat 13b decreases to the value equal to or lower than the insulation resistance lower limit ensured value. Namely, based on the mat water-absorption amount, the ECU 70 determines whether or not the present state is such a state that the insulation property of the retention mat 13b is not ensured.

Here, the predetermined amount used in step S404 is set based on a relationship between the mat water-absorption amount and the insulation resistance of the retention mat 13b. Concretely, the relationship between the mat water-absorption amount and the insulation resistance is obtained by preliminarily performing an experiment, and the mat water-absorption amount corresponding to the insulation resistance lower limit ensured value is obtained, so as to set the predetermined amount based on the obtained mat water-absorption amount. For example, the predetermined amount is set to the mat water-absorption amount corresponding to the insulation resistance lower limit ensured value, or is set to an amount which is smaller than the mat water-absorption amount corresponding to the insulation resistance lower limit ensured value to some extent.

When the mat water-absorption amount is equal to or larger than the predetermined amount (step S404: Yes), the process goes to step S405. In this case, it can be said that there is a high possibility that the insulation resistance of the retention mat 13b decreases to the value equal to or lower than the insulation resistance lower limit ensured value. Therefore, in step S405, the ECU 70 prohibits applying the current to the EHC 13. Then, the process goes to step S406, and the ECU 70 performs a determination (hereinafter referred to as "determination of request for starting engine") related to a request for starting the engine 1. In the determination of the request for starting the engine 1, the ECU 70 determines whether or not to perform the catalyst warming by the engine 1. Then, the process ends. The determination of the request for starting the engine 1 will be described in details, later.

Meanwhile, when the mat water-absorption amount is smaller than the predetermined amount (step S404: No), the process goes to step S407. In this case, it can be said that there is a substantially low possibility that the insulation resistance of the retention mat 13b decreases to the value equal to or lower than the insulation resistance lower limit ensured value. Therefore, in step S407, the ECU 70 permits to apply the current to the EHC 13. Then, the process goes to step S408, and the ECU 70 performs the catalyst warming by applying the current to the EHC 13. Afterward, the process ends.

By the above determination process of the EHC warming, it is possible to prohibit applying the current to the EHC 13 when the mat water-absorption amount is equal to or larger than the predetermined amount, and hence it becomes possible to appropriately prevent the electrical leak of the EHC 13.

(Calculation of Mat Water-Absorption Amount)

Next, a description will be given of a calculation method of the mat water-absorption amount in the second embodiment. In the second embodiment, the ECU 70 functions as the water amount estimation unit, and calculates the mat water-absorption amount based on an amount of the condensate water generated in the exhaust passage 12, an amount of the condensate water reaching the EHC 13 in the condensate water generated in the exhaust passage 12 and an evaporation coefficient indicating a proportion of an amount of the condensate water evaporated by the exhaust heat to the amount of the condensate water absorbed by the retention mat 13b. Hereinafter, the amount of the condensate water generated in the exhaust passage 12 is referred to as "generated condensate water amount", and the amount of the condensate water reaching the EHC 13 in the condensate water generated in the exhaust passage 12 is referred to as "condensate water amount reaching EHC". Specifically, "condensate water amount reaching EHC" indicates the amount of the condensate water absorbed by the retention mat 13b in the condensate water reaching the EHC 13.

In this case, the ECU 70 repeatedly calculates the mat water-absorption amount in a predetermined cycle. Concretely, the ECU 70 stores the mat water-absorption amount calculated last time (hereinafter suitably referred to as "mat water-absorption amount (previous value)"), and calculates the mat water-absorption amount this time (hereinafter suitably referred to as "mat water-absorption amount (present value)") by using the stored mat water-absorption amount (previous value). Namely, the ECU 70 calculates the present mat water-absorption amount based on the amount of the remaining condensate water in the retention mat 13b. The mat water-absorption amount (previous value) is stored in the SRAM, for example.

Additionally, in the embodiment, when the mat water-absorption amount (previous value) is not stored, namely when the stored mat water-absorption amount (previous value) is cleared, the ECU 70 sets a maximum amount (hereinafter referred to as "maximum mat water-absorption amount") of the condensate water absorbed by the retention mat 13b to the mat water-absorption amount (previous value), so as to calculate the mat water-absorption amount (present value). For example, when the information stored in the SRAM is cleared by removing the battery 60 (hereinafter, the state is referred to as "battery erasing"), the ECU 70 sets the maximum mat water-absorption amount to the mat water-absorption amount (previous value).

Therefore, when the stored mat water-absorption amount (previous value) is cleared, it is possible to certainly prevent an incorrect determination of the insulation resistance of the retention mat 13b. For example, it is possible to prevent such an incorrect determination that the mat water-absorption amount is smaller than the predetermined amount even though the mat water-absorption amount is actually larger than the predetermined amount. Therefore, it becomes possible to appropriately prevent the electrical leak of the EHC 13.

Figure 11:
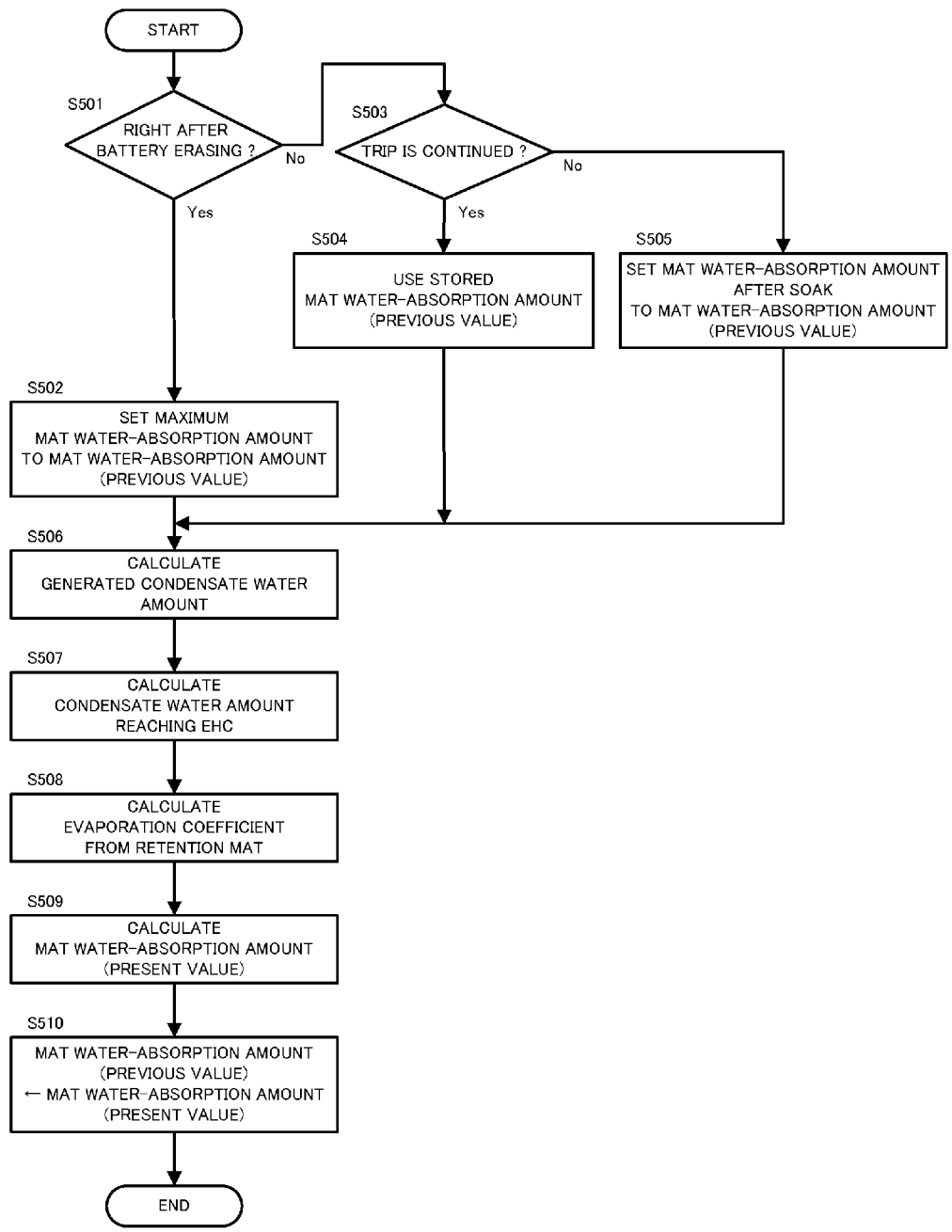
FIG. 11 is a flow chart showing a calculation process of a mat water-absorption amount in a second embodiment.

Next, a description will be given of a concrete process of the calculation of the mat water-absorption amount, with reference to FIG. 11. FIG. 11 is a flowchart showing a calculation process of the mat water-absorption amount in the second embodiment. The calculation process of the mat water-absorption amount is executed in step S403 in the above determination process of the EHC warming (see FIG. 10). Additionally, the process is executed by the ECU 70.

First, in step S501, the ECU 70 determines whether or not the present state is the state right after the battery erasing. Namely, the ECU 70 determines whether or not the mat water-absorption amount (previous value) is cleared. When the present state is the state right after the battery erasing (step S501: Yes), the process goes to step S502. In this case, since the mat water-absorption amount (previous value) is cleared, the ECU 70 sets the maximum mat water-absorption amount to the mat water-absorption amount (previous value) in step S502. For example, the ECU 70 uses the maximum mat water-absorption amount obtained by preliminarily performing an experiment. Then, the process goes to step S506.

In contrast, the present state is not the state right after the battery erasing (step S501: No), the process goes to step S503. In step S503, the ECU 70 obtains the mat water-absorption amount (previous value) stored in the SRAM, and determines whether or not the present trip is continued. In other words, the ECU 70 determines whether or not the soak is not performed. When the trip is continued (step S503: Yes), the process goes to step S504. In this case, the ECU 70 determines to use the stored mat water-absorption amount (previous value) as it is (step S504). Then, the process goes to step S506.

Meanwhile, the trip is not continued (step S503: No), the process goes to step S505. In this case, since the soak is performed, it can be said that the stored mat water-absorption amount (previous value) should not be used. This is because the mat water-absorption amount changes during the soak and hence the mat water-absorption amount after the soak tends to be different from the stored mat water-absorption amount (previous value). Therefore, in step S505, the ECU 70 calculates the mat water-absorption amount after the soak, and sets the calculated mat water-absorption amount to the mat water-absorption amount (previous value). Concretely, as shown in an equation (1), the ECU 70 calculates the mat water-absorption amount after the soak, based on a function F11 defined by a previous trip water-absorption amount, soak time, an engine water temperature change and an outside air-temperature change. Then, the process goes to step S506.

$$\text{Mat Water-Absorption Amount After Soak} = F11(\text{Previous Trip Water-Absorption Amount, Soak Time, Engine Water Temperature Change, Outside Air-Temperature Change}) \quad (1)$$

In the equation (1), "previous trip water-absorption amount" corresponds to the mat water-absorption amount (previous value) which is retained at the start of this calculation process of the mat water-absorption amount, namely the mat water-absorption amount (previous value) which is stored at the end of the last calculation process of the mat water-absorption amount. Additionally, as for the soak time, the engine water temperature change and the outside air-temperature change in the equation (1), detection values of sensors in the hybrid vehicle 100 or values calculated by the detection values are used, for example. The function F11 is set based on a theoretical formula.

In step S506, the ECU 70 calculates the generated condensate water amount. Namely, the ECU 70 calculates the condensate water amount which is generated when the exhaust gas is cooled by the exhaust passage 12 during the operation of the engine 1. Concretely, as shown an equation (2), the ECU 70 calculates the generated condensate water amount, based on a function F12 defined by an exhaust gas flow amount, the exhaust gas temperature, the engine water temperature and the air-fuel ratio. Then, the process goes to step S507.

$$\text{Generated Condensate Water Amount} = \Sigma\{F12(\text{Exhaust Gas Flow Amount, Exhaust Gas Temperature, Engine Water Temperature, Air-Fuel Ratio})\} \quad (2)$$

In the equation (2), "Σ" indicates that a total amount of the condensate water amount generated during the cycle of performing the calculation process of the mat water-absorption amount is calculated. Additionally, as for the exhaust gas flow amount, the exhaust gas temperature, the engine water temperature and the air-fuel ratio in the equation (2), detection values of sensors in the hybrid vehicle 100 or values calculated by the detection values are used, for example. The function F12 is set based on a theoretical formula.

In step S507, the ECU 70 calculates the condensate water amount reaching the EHC 13, based on the generated condensate water amount calculated in step S506. Namely, the ECU 70 calculates the amount of the condensate water absorbed by the retention mat 13b in the generated condensate water amount. Concretely, as shown in an equation (3), the ECU 70 calculates the condensate water amount reaching the EHC 13, based on a function F13 defined by the generated condensate water amount, exhaust system design specifications and an exhaust gas flow speed. Then, the process goes to step S508.

$$\text{Condensate Water Amount Reaching EHC} = F13(\text{Generated Condensate Water Amount, Exhaust System Design Specifications, Exhaust Gas Flow Speed}) \quad (3)$$

In the equation (3), "exhaust system design specifications" include an inner diameter of the exhaust passage 12, a cross-sectional area of the EHC 13, a distance of the exhaust passage 12 from the exhaust manifold of the engine 1 to the EHC 13 and a superficial area of the exhaust passage 12. For the exhaust system design specifications, values preliminarily stored in the memory are used. Additionally, as for the exhaust gas flow speed in the equation (3), a value calculated by detection values of sensors in the hybrid vehicle 100 is used, for example. The function F13 is set based on a theoretical formula.

In step S508, the ECU 70 calculates the evaporation coefficient from the retention mat 13b. Namely, the ECU 70 calculates the proportion of the amount of the condensate water evaporated by the exhaust heat to the amount of the condensate water absorbed by the retention mat 13b. Concretely, as shown in an equation (4), the ECU 70 calculates the evaporation coefficient, based on a function F14 defined by the exhaust gas flow amount, the exhaust gas temperature, the outside air-temperature and a mat material modulus. Then, the process goes to step S509.

$$\text{Evaporation Coefficient} = F14(\text{Exhaust Gas Flow Amount, Exhaust Gas Temperature, Outside Air-Temperature, Mat Material Modulus}) \quad (4)$$

For the mat material modulus in the equation (4), a value preliminarily stored in the memory is used. Additionally, as for the exhaust gas flow amount, the exhaust gas temperature and the outside air-temperature, detection values of sensors in the hybrid vehicle 100 or values calculated by the detection values are used, for example. The function F14 is set based on a theoretical formula.

In step S509, the ECU 70 calculates the mat water-absorption amount (present value). Concretely, the ECU 70 calculates the mat water-absorption amount (present value), based on the mat water-absorption amount (previous value) which is set in any one of steps S502, S504 and S505, the condensate water amount reaching the EHC 13 calculated in step S507 and the evaporation coefficient calculated in step S508. Namely, the ECU 70 calculates the mat water-absorption amount (present value), based on the amount of the remaining condensate water in the retention mat 13b, the amount of the condensate water reaching the EHC 13 and the proportion of the condensate water evaporated from the retention mat 13b. In this case, the ECU 70 calculates the mat water-absorption amount (present value) based on an equation (5). Then, the process goes to step S510.

$$\text{Mat Water-Absorption Amount (Present Value)} = \{\text{Mat Water-Absorption Amount (Previous Value)} + \text{Condensate Water Amount Reaching EHC}\} \times (1 - \text{Evaporation Coefficient}) \quad (5)$$

In step S510, the ECU 70 stores the mat water-absorption amount (present value) calculated in step S509. Concretely, the ECU 70 updates the stored mat water-absorption amount (previous value) to the calculated mat water-absorption amount (present value). For example, the ECU 70 stores the mat water-absorption amount (present value) in the SRAM. Then, the process ends.

By the calculation process of the mat water-absorption amount, it is possible to accurately estimate the mat water-absorption amount. Therefore, in the above determination process of the EHC warming, it becomes possible to accurately perform the determination using the mat water-absorption amount (step S404). Concretely, based on the mat water-absorption amount, it becomes possible to accurately determine whether or not the insulation resistance of the retention mat 13b decreases to the value equal to or lower than the predetermined value.

In steps S505, S506, S507, S508, though the mat water-absorption amount after the soak, the generated condensate water amount, the condensate water amount reaching the EHC 13 and the evaporation coefficient are calculated by the functions F11, F12, F13, F14, it is not limited to this. Instead of using the functions, the mat water-absorption amount after the soak, the generated condensate water amount, the condensate water amount reaching the EHC 13 and the evaporation coefficient may be calculated with reference to a preliminarily set map.

(Determination of Request for Starting Engine)

Next, a description will be given of the determination of the request for starting the engine 1 which is executed in step S406 in the above determination process of the EHC warming (see FIG. 10).

Basically, in the second embodiment, when the mat water-absorption amount is equal to or larger than the predetermined amount (step S404: Yes), the ECU 70 prohibits applying the current to the EHC 13, and performs the catalyst warming by the engine 1. Concretely, the ECU 70 starts the engine 1, and performs the control of operating the engine 1 so that the ignition timing is delayed, in order to activate the catalyst. Hereinafter, the operation of the engine 1 is referred to as "catalyst warming operation". Meanwhile, when a request (hereinafter referred to as "request for high-power driving") for making the engine 1 output a drive power more than a predetermined value is issued at the time of performing the catalyst warming operation, the ECU 70 stops the catalyst warming operation. In this case, the ECU 70 controls the operation of the engine 1 so that the hybrid vehicle 100 travels by using the output of the engine 1 (for example, a so-called "HV traveling" is performed). Hereinafter, the above operation of the engine 1 is referred to as "output operation".

Next, a description will be given of two examples of the determination process of the request for starting the engine 1 (hereinafter referred to as "determination process of request for starting engine according to first example" and "determination process of request for starting engine according to second example").

Figure 12:
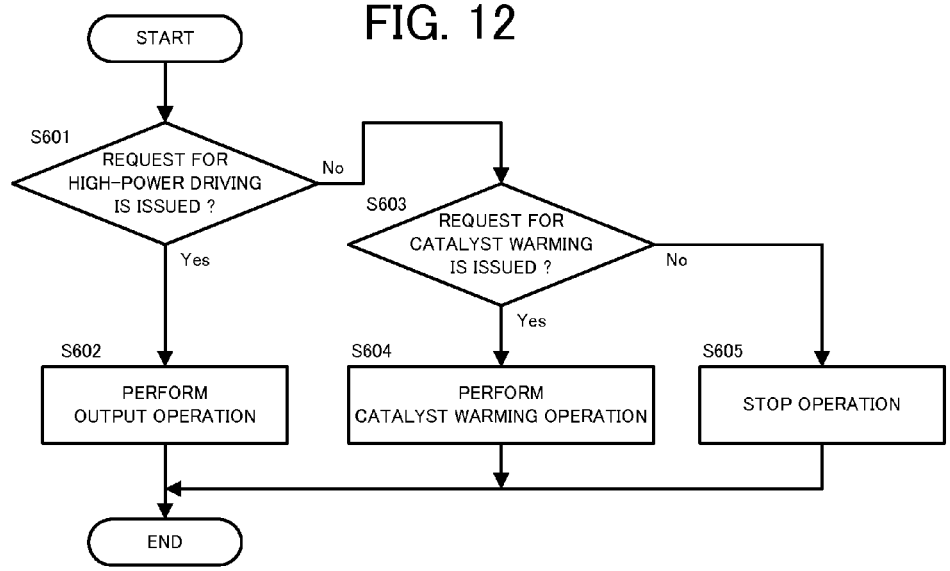
FIG. 12 is a flow chart showing a determination process of a request for starting an engine according to a first example.

FIG. 12 is a flow chart showing the determination process of the request for starting the engine 1 according to the first example. The determination process of the request for starting the engine 1 according to the first example is executed in step S406 in the above determination process of the EHC warming (see FIG. 10). Additionally, the process is executed by the ECU 70.

First, in step S601, the ECU 70 determines whether or not the request for the high-power driving is issued from the hybrid vehicle 100 side. Namely, the ECU 70 determines whether or not the request for making the engine 1 output the drive power more than the predetermined value is issued. For example, the ECU 70 performs the determination based on the accelerator opening degree.

When the request for the high-power driving is issued (step S601: Yes), the process goes to step S602. In this case, the ECU 70 performs the output operation (step S602). For example, when the catalyst warming operation is already performed, the ECU 70 stops the catalyst warming operation, and performs the output operation. Then, the process ends. In contrast, when the request for the high-power driving is not issued (step S601: No), the process goes to step S603.

In step S603, the ECU 70 determines whether or not the request for the catalyst warming is issued from the EHC 13 side. In this case, the ECU 70 performs a similar determination as the above determination of the request for applying the current to the EHC 13 in step S401. When the request for the catalyst warming is issued (step S603: Yes), the process goes to step S604. In this case, the ECU 70 performs the catalyst warming by the engine 1 (step S604). Concretely, the ECU 70 performs the catalyst warming operation such as the control of delaying the ignition timing. Then, the process ends.

It is not limited that the control of delaying the ignition timing is performed as the catalyst warming operation. As long as the exhaust gas temperature can be increased, a control other than the control of delaying the ignition timing may be performed. For example, a control of delaying a phase of valve timings between the intake valve 7 and the exhaust valve 8 can be performed.

Meanwhile, when the request for the catalyst warming is not issued (step S603: No), the process goes to step S605. In this case, since both the request for the high-power driving and the request for the catalyst warming are not issued, the ECU 70 stops the operation of the engine 1 (step S605). Then, the process ends.

By the determination process of the request for starting the engine 1 according to the first example, even if the catalyst warming by applying the current cannot be performed, it is possible to appropriately maintain the activated state of the catalyst by performing the catalyst warming by the engine 1.

Next, a description will be given of the determination process of the request for starting the engine 1 according to the second example, with reference to FIG. 13. The determination process of the request for starting the engine 1 according to the second example is performed instead of the above determination process of the request for starting the engine 1 according to the first example.

The determination process of the request for starting the engine 1 according to the second example is different from the determination process of the request for starting the engine 1 according to the first example, in that the ECU 70 continues the operation of the engine 1 until the condensate water absorbed by the retention mat 13b is completely evaporated, when the request for the high-power driving is not issued from the hybrid vehicle 100 side after performing the catalyst warming operation. Namely, even if the request for the catalyst warming is not issued by performing the catalyst warming operation, the ECU 70 continues the operation of the engine 1 after the catalyst warming operation, in order to evaporate the condensate water absorbed by the retention mat 13b by the exhaust heat. Hereinafter, the operation of the engine 1 for evaporating the condensate water absorbed by the retention mat 13b is referred to as "operation for evaporating mat water".

Figure 13:
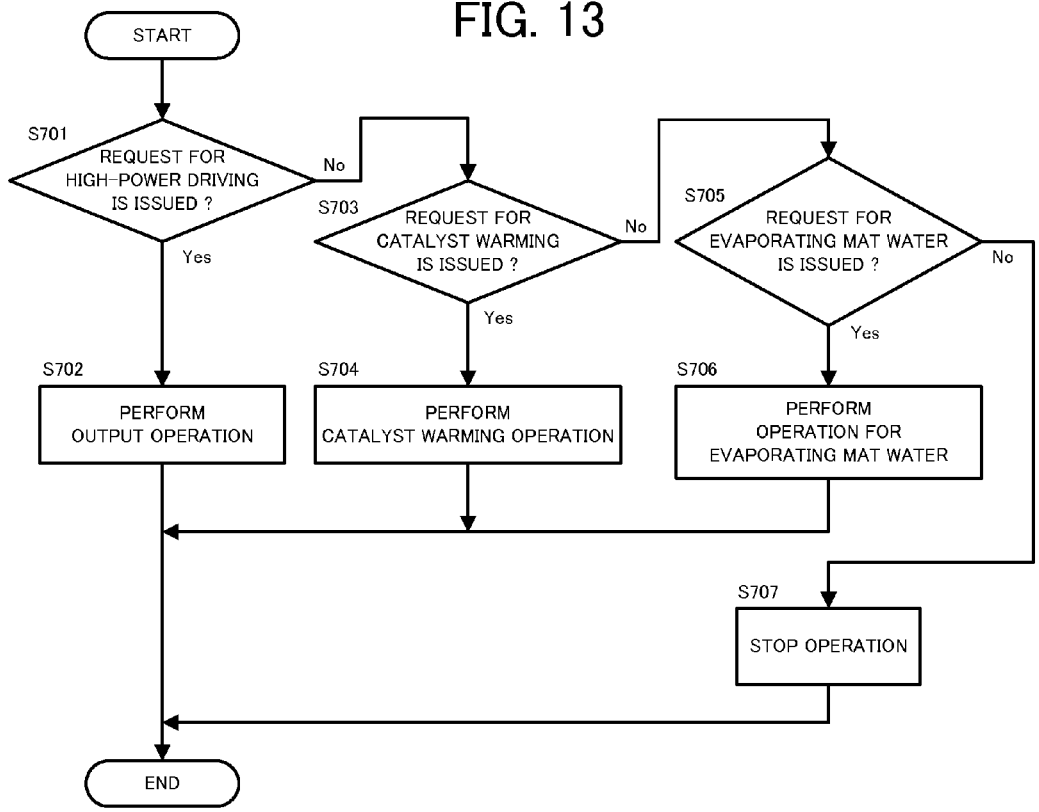
FIG. 13 is a flow chart showing a determination process of a request for starting an engine according to a second example.

FIG. 13 is a flow chart showing the determination process of the request for starting the engine 1 according to the second example. The determination process of the request for starting the engine 1 according to the second example is executed in step S406 in the above determination process of the EHC warming (see FIG. 10). Additionally, the process is executed by the ECU 70.

Since processes in steps S701 to S704 are similar to the processes in steps S601 to S604, explanations thereof are omitted. Here, a description will be given of processes in steps S705 to S707.

The process in step S705 is performed when the request for the catalyst warming is not issued (step S703: No). For example, the process is performed when the EHC floor temperature becomes higher than the predetermined temperature. In step S705, the ECU 70 determines whether or not a request (hereinafter referred to as "request for evaporating mat water") for evaporating the condensate water absorbed by the retention mat 13b is issued. For example, the ECU 70 performs the determination based on the present mat water-absorption amount. As an example, when the mat water-absorption amount is approximately 0, the EUC 70 determines that the request for evaporating the mat water is not issued.

When the request for evaporating the mat water is issued (step S705: Yes), the process goes to step S706. In this case, the ECU 70 performs the operation for evaporating the mat water (step S706). As an example, the ECU 70 performs a similar operation as the catalyst warming operation, as the operation for evaporating the mat water. As another example, the ECU 70 performs an operation of the engine 1 so that the exhaust gas temperature becomes higher than at least 100 degrees Celsius, as the operation for evaporating the mat water. This is because, if the exhaust gas temperature is higher than 100 degrees Celsius, the condensate water absorbed by the retention mat 13b can be evaporated by the exhaust heat. In both examples, it is preferable that the ECU 70 makes the engine 1 perform the driving corresponding to the idling driving. After step S706, the process ends.

Meanwhile, when the request for evaporating the mat water is not issued (step S705: No), the process goes to step S707. In this case, since the request for the high-power driving, the request for the catalyst warming and the request for evaporating the mat water are not issued, the ECU 70 stops the operation of the engine 1 (step S707). Then, the process ends.

By the determination process of the request for starting the engine 1 according to the second example, since the operation of the engine 1 is continued after performing the catalyst warming operation, it is possible to appropriately evaporate the condensate water absorbed by the retention mat 13b. Therefore, since there is a substantially high possibility that the mat water-absorption amount is lower than the predetermined amount when the request for applying the current to the EHC 13 is issued next time, the possibility that the catalyst warming by applying the current can be performed increased. In other words, it tends not to perform the catalyst warming by the engine 1. Thereby, it is possible to decrease the frequency of the start of the engine 1, and hence it becomes possible to suppress the deterioration of the drivability and to improve the fuel consumption.

It is not limited that the operation for evaporating the mat water is performed until the condensate water absorbed by the retention mat 13b is completely evaporated. Even if the condensate water absorbed by the retention mat 13b is not completely evaporated, the operation for evaporating the mat water may be performed until the remaining condensate water in the retention mat 13b becomes lower than a predetermined value. For example, the operation for evaporating the mat water can be performed until the remaining condensate water in the retention mat 13b becomes lower than an amount which is smaller than the mat water-absorption amount corresponding to the insulation resistance lower limit ensured value, to some extent. Therefore, compared with the case of not performing the operation for evaporating the mat water, since there is a high possibility that the mat water-absorption amount is lower than the predetermined amount when the request for applying the current to the EHC 13 is issued next time, the possibility that the catalyst warming by applying the current can be performed increased, too.

The above determination of the request for starting the engine 1 may be applied to the first embodiment, too. In the first embodiment, when the retention mat temperature is equal to or higher than the predetermined temperature (step S103: Yes), the catalyst warming by the engine 1 is performed without performing a particular determination. However, when the retention mat temperature is equal to or higher than the predetermined temperature, the determination of the request for starting the engine 1 may be performed so as to determine whether or not to perform the catalyst warming by the engine 1. Concretely, when the retention mat temperature is equal to or higher than the predetermined temperature and the request for the high-power driving is issued, the output operation can be performed without performing the catalyst warming operation. Additionally, even if the request for the catalyst warming is not issued by performing the catalyst warming operation, the operation of the engine 1 can be continued after the catalyst warming operation. For example, the operation of the engine 1 can be continued until the retention mat temperature becomes lower than at least the insulation ensured temperature.

[Third Embodiment]

Next, a description will be given of a third embodiment. The third embodiment is different from the first and second embodiments in that the insulation resistance of the retention mat 13b is estimated based on an amount of carbon deposited in the retention mat 13b (hereinafter referred to as "carbon deposition amount"). Namely, the third embodiment is different from the first and second embodiments in that the permission or prohibition of applying the current to the EHC 13 is determined based on the carbon deposition amount instead of the retention mat temperature and the mat water-absorption amount. Concretely, in the third embodiment, when the carbon deposition amount is equal to or larger than a predetermined amount, the ECU 70 determines that the insulation resistance of the retention mat 13b decreases to the value equal to or lower than the predetermined value, and prohibits applying the current to the EHC 13.

The reason for performing the above control based on the carbon deposition amount is as follows. There is a case that the exhaust gas includes a particulate generated by an incomplete combustion of the fuel. A relatively large amount of particulate tends to be generated when the air-fuel ratio of the exhaust gas is a rich state and the exhaust gas amount is large. The particulate corresponds to soot, and a major component of the particulate is the carbon. In the specification, the word "carbon" shall include the particulate. Namely, though the particulate actually includes matters other than the carbon, the word "carbon" is used for the particulate including the matters other than the carbon, too.

Meanwhile, since the EHC 13 is exposed in the exhaust passage 12, the carbon generated in the exhaust passage 12 tends to attach to the retention mat 13b and to deposit. When the carbon is deposited in the retention mat 13b, the insulation resistance of the retention mat 13b tends to decrease. Concretely, when the carbon deposition amount becomes larger, the insulation resistance tends to decrease. By the way, when the retention mat 13b is heated to the high temperature and the exhaust gas including oxygen is supplied to the retention mat 13b, the carbon deposited in the retention mat 13b is burned and removed. Namely, the carbon is burned down.

Thus, in the third embodiment, when the carbon deposition amount is equal to or larger than the predetermined amount, the ECU 70 determines that the insulation resistance of the retention mat 13b decreases to the value equal to or lower than the predetermined value (namely, insulation resistance lower limit ensured value), and prohibits applying the current to the EHC 13. In this case, even if the request for applying the current to the EHC 13 is issued, since the insulation property of the retention mat 13b is not ensured, the ECU 70 does not perform the catalyst warming by applying the current.

(Determination of EHC Warming)

Figure 14:
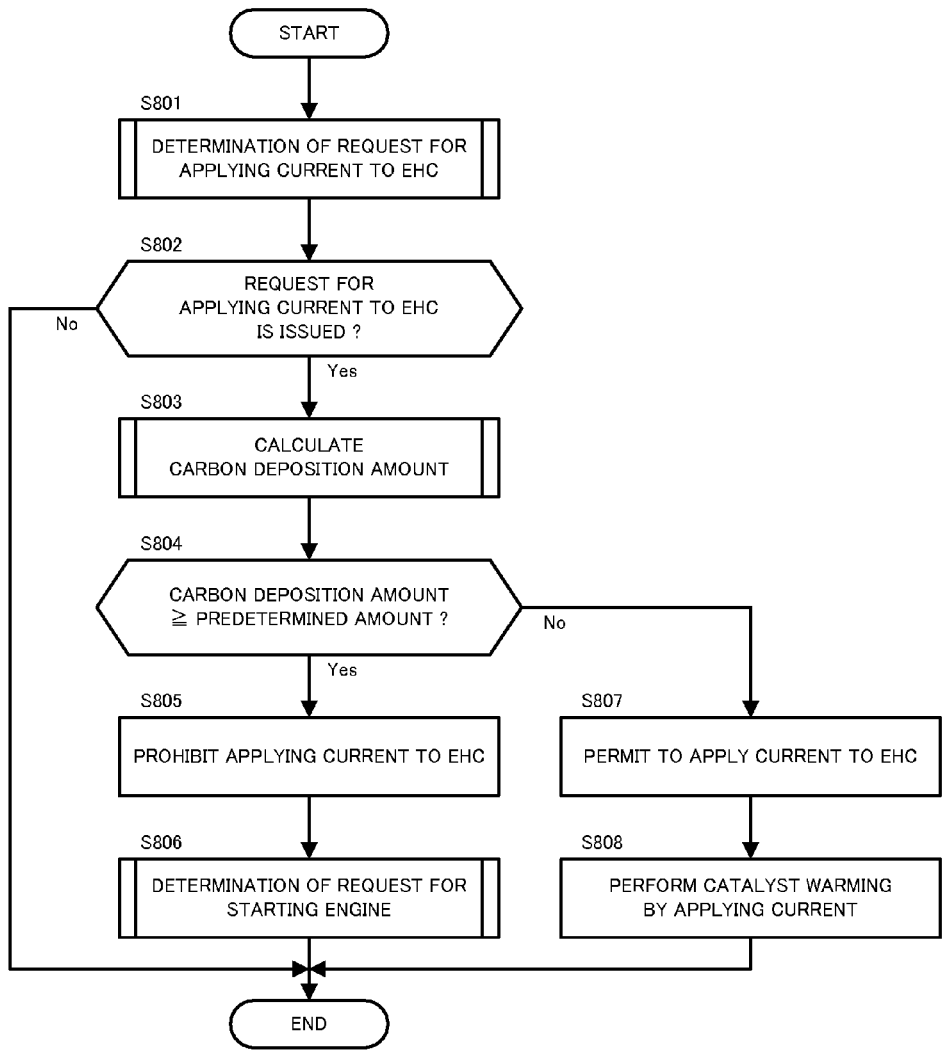
FIG. 14 is a flow chart showing a determination process of an EHC warming in a third embodiment.

Next, a concrete description will be given of a determination of the EHC warming in the third embodiment. FIG. 14 is a flow chart showing a determination process of the EHC warming in the third embodiment. The process is repeatedly executed by the ECU 70 in a predetermined cycle.

First, in step S801, the ECU 70 performs the determination of the request for applying the current to the EHC 13. Concretely, the ECU 70 performs the determination of the request for applying the current to the EHC 13 similar to step S101 in FIG. 6. Namely, the ECU 70 performs the determination process of the request for applying the current to the EHC 13 as shown in FIG. 7. So, explanations thereof are omitted. Then, the process goes to step S802.

In step S802, the ECU 70 determines whether or not the request for applying the current to the EHC 13 is issued. When the request for applying the current to the EHC 13 is issued (step S802: Yes), the process goes to step S803. When the request for applying the current to the EHC 13 is not issued (step S802: No), the process ends.

In step S803, the ECU 70 calculates the carbon deposition amount. Then, the process goes to step S804. A method for calculating the carbon deposition amount will be described in details, later.

In step S804, the ECU 70 determines whether or not the carbon deposition amount is equal to or larger than the predetermined amount. In step S804, based on the carbon deposition amount, the ECU 70 determines whether or not the present state is such a state that the insulation resistance of the retention mat 13b decreases to the value equal to or lower than the insulation resistance lower limit ensured value. Namely, based on the carbon deposition amount, the ECU 70 determines whether or not the present state is such a state that the insulation property of the retention mat 13b is not ensured.

Here, the predetermined amount used in step S804 is set based on a relationship between the carbon deposition amount and the insulation resistance of the retention mat 13b. Concretely, the relationship between the carbon deposition amount and the insulation resistance is obtained by preliminarily performing an experiment, and the carbon deposition amount corresponding to the insulation resistance lower limit ensured value is obtained, so as to set the predetermined amount based on the obtained carbon deposition amount. For example, the predetermined amount is set to the carbon deposition amount corresponding to the insulation resistance lower limit ensured value, or is set to an amount which is smaller than the carbon deposition amount corresponding to the insulation resistance lower limit ensured value to some extent.

When the carbon deposition amount is equal to or larger than the predetermined amount (step S804: Yes), the process goes to step S805. In this case, it can be said that there is a high possibility that the insulation resistance of the retention mat 13b decreases to the value equal to or lower than the insulation resistance lower limit ensured value. Therefore, in step S805, the ECU 70 prohibits applying the current to the EHC 13. Then, the process goes to step S806, and the ECU 70 performs the determination of the request for starting the engine 1. Concretely, the ECU 70 performs a similar process as the above determination process of the request for starting the engine 1 according to the first example as shown in FIG. 12, or performs a similar process as the above determination process of the request for starting the engine 1 according to the second example as shown in FIG. 13. Then, the process ends.

Meanwhile, when the carbon deposition amount is smaller than the predetermined amount (step S804: No), the process goes to step S807. In this case, it can be said that there is a substantially low possibility that the insulation resistance of the retention mat 13b decreases to the value equal to or lower than the insulation resistance lower limit ensured value. Therefore, in step S807, the ECU 70 permits to apply the current to the EHC 13. Then, the process goes to step S808, and the ECU 70 performs the catalyst warming by applying the current to the EHC 13. Afterward, the process ends.

By the above determination process of the EHC warming, it is possible to prohibit applying the current to the EHC 13 when the carbon deposition amount is equal to or larger than the predetermined amount, and hence it becomes possible to appropriately prevent the electrical leak of the EHC 13.

Here, when the ECU 70 performs the determination process of the request for starting the engine 1 according to the first example in step S806, the ECU 70 basically performs a similar process as the second embodiment. Namely, the ECU 70 performs a similar process as the process shown in FIG. 12. Concretely, the ECU 70 performs the output operation when the request for the high-power driving is issued, and the ECU 70 performs the catalyst warming operation when the request for the high-power driving is not issued and the request for the catalyst warming is issued. Therefore, even if the catalyst warming by applying the current cannot be performed, it is possible to appropriately maintain the activated state of the catalyst by performing the catalyst warming by the engine 1.

Meanwhile, when the ECU 70 performs the determination process of the request for starting the engine 1 according to the second example in step S806, the ECU 70 continues the operation of the engine 1 until the carbon deposited in the retention mat 13b is completely burned down, in such a case that the request for the high-power driving is not issued from the hybrid vehicle 100 side after performing the catalyst warming operation. Namely, even if the request for the catalyst warming is not issued by performing the catalyst warming operation, the ECU 70 continues the operation of the engine 1 after the catalyst warming operation, in order to burn down the carbon deposited in the retention mat 13b. For example, the ECU 70 performs the control of operating the engine 1 so that the exhaust gas temperature becomes the high temperature, in order to appropriately burn down the carbon deposited in the retention mat 13b.

When the determination of the request for starting the engine 1 according to the second example is applied to the third embodiment, since there is a substantially high possibility that the carbon deposition amount is lower than the predetermined amount when the request for applying the current to the EHC 13 is issued next time, the possibility that the catalyst warming by applying the current can be performed increases. In other words, it tends not to perform the catalyst warming by the engine 1. Thereby, it is possible to decrease the frequency of the start of the engine 1, and hence it becomes possible to suppress the deterioration of the drivability and to improve the fuel consumption.

It is not limited that the operation of the engine 1 is continued until the carbon deposited in the retention mat 13b is completely burned down. Even if the carbon deposited in the retention mat 13b is not completely burned down, the operation of the engine 1 may be continued until the remaining carbon in the retention mat 13b becomes lower than a predetermined value. For example, the operation of the engine 1 can be continued until the remaining carbon in the retention mat 13b becomes lower than an amount which is smaller than the carbon deposition amount corresponding to the insulation resistance lower limit ensured value, to some extent.

(Calculation of Carbon Deposition Amount)

Next, a description will be given of a calculation method of the carbon deposition amount in the third embodiment. In the third embodiment, the ECU 70 functions as the carbon amount estimation unit, and calculates the carbon deposition amount based on the air-fuel ratio, the exhaust gas amount, the exhaust gas temperature and the exhaust system design specifications (the exhaust system includes the EHC 13). Concretely, the ECU 70 calculates the carbon deposition amount based on an amount of the carbon generated in the exhaust passage 12, an amount of the carbon reaching the EHC 13 in the carbon generated in the exhaust passage 12 and a burned down coefficient indicating a proportion of an amount of the burned down carbon to the amount of the carbon deposited in the retention mat 13b. Hereinafter, the amount of the carbon generated in the exhaust passage 12 is referred to as "generated carbon amount", and the amount of the carbon reaching the EHC 13 in the carbon generated in the exhaust passage 12 is referred to as "carbon amount reaching EHC". Specifically, "carbon amount reaching EHC" indicates the amount of the carbon attaching to the retention mat 13b in the carbon reaching the EHC 13.

In this case, the ECU 70 repeatedly calculates the carbon deposition amount in a predetermined cycle. Concretely, the ECU 70 stores the carbon deposition amount calculated last time (hereinafter suitably referred to as "carbon deposition amount (previous value)"), and calculates the carbon deposition amount this time (hereinafter suitably referred to as "carbon deposition amount (present value)") by using the stored carbon deposition amount (previous value). Namely, the ECU 70 calculates the present carbon deposition amount based on the amount of the remaining carbon in the retention mat 13b.

Figure 15:
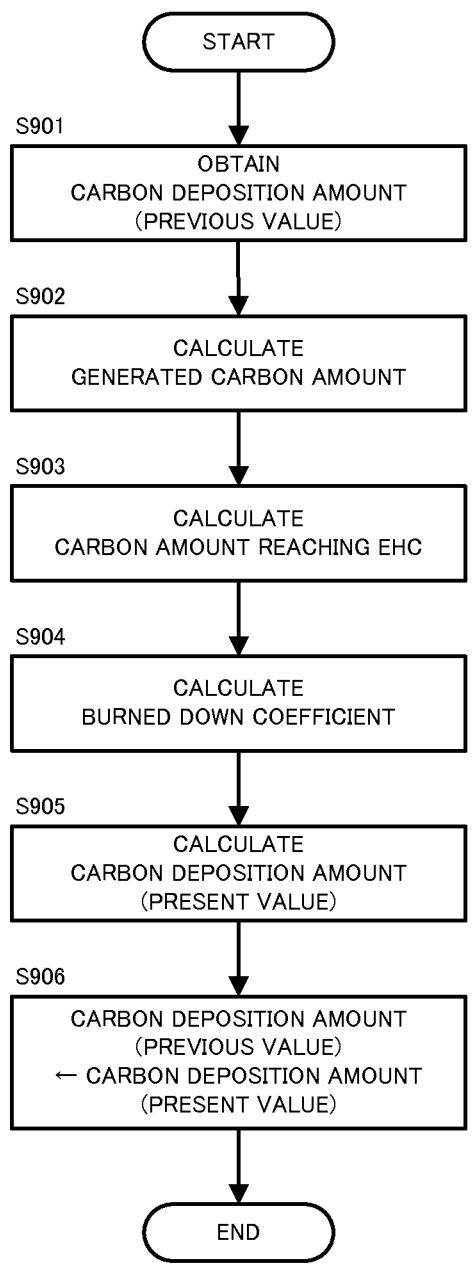
FIG. 15 is a flow chart showing a calculation process of a carbon deposition amount in a third embodiment.

Next, a description will be given of a concrete process of the calculation of the carbon deposition amount, with reference to FIG. 15. FIG. 15 is a flow chart showing a calculation process of the carbon deposition amount in the third embodiment. The calculation process of the carbon deposition amount is executed in step S803 in the above determination process of the EHC warming (see FIG. 14). Additionally, the process is executed by the ECU 70.

First, in step S901, the ECU 70 obtains the carbon deposition amount (previous value) stored in the SRAM. Then, the process goes to step S902.

In step S902, the ECU 70 calculates the generated carbon amount. Namely, the ECU 70 calculates the amount of the carbon generated by the incomplete combustion of the fuel during the operation of the engine 1. Concretely, as shown by an equation (6), the ECU 70 calculates the generated carbon amount, based on a function F21 defined by the exhaust gas flow amount, the exhaust gas temperature and the air-fuel ratio. Then, the process goes to step S903.

$$\text{Generated carbon amount} = \Sigma\{F21(\text{Exhaust Gas Flow Amount, Exhaust Gas Temperature, Air-Fuel Ratio})\} \quad (6)$$

In the equation (6), "$\Sigma$" indicates that a total amount of the carbon amount generated during the cycle of performing the calculation process of the carbon deposition amount is calculated. Additionally, as for the exhaust gas flow amount, the exhaust gas temperature and the air-fuel ratio in the equation (6), detection values of sensors in the hybrid vehicle 100 or values calculated by the detection values are used, for example. The function F21 is set based on a theoretical formula.

In step S903, the ECU 70 calculates the carbon amount reaching the EHC 13, based on the generated carbon amount calculated in step S902. Namely, the ECU 70 calculates the amount of the carbon attaching to the retention mat 13b in the generated carbon amount. Concretely, as shown by an equation (7), the ECU 70 calculates the carbon amount reaching the EHC 13, based on a function F22 defined by the generated carbon amount and the exhaust system design specifications. Then, the process goes to step S904.

$$\text{Carbon Amount Reaching EHC} = F22(\text{Generated Carbon Amount, Exhaust System Design Specifications}) \quad (7)$$

In the equation (7), "exhaust system design specifications" include the inner diameter of the exhaust passage 12, the cross-sectional area of the EHC 13, the distance of the exhaust passage 12 from the exhaust manifold of the engine 1 to the EHC 13 and the superficial area of the exhaust passage 12. For the exhaust system design specifications, values preliminarily stored in the memory are used. The function F22 is set based on a theoretical formula.

In step S904, the ECU 70 calculates the burned down coefficient of the carbon in the retention mat 13b. Namely, the ECU 70 calculates the proportion of the amount of the removed carbon by the burning to the amount of the carbon deposited in the retention mat 13b. Concretely, as shown by an equation (8), the ECU 70 calculates the burned down coefficient, based on a function F23 defined by the exhaust gas temperature, the air-fuel ratio, the outside air-temperature and the mat material modulus. Then, the process goes to step S905.

$$\text{Burned Down Coefficient} = F23(\text{Exhaust Gas Temperature, Air-Fuel Ratio, Outside Air-Temperature, Mat Material Modulus}) \quad (8)$$

For the mat material modulus in the equation (8), a value preliminarily stored in the memory is used. Additionally, as for the exhaust gas temperature, the air-fuel ratio and the outside air-temperature, detection values of sensors in the hybrid vehicle 100 or values calculated by the detection values are used, for example. The function F23 is set based on a theoretical formula.

In step S905, the ECU 70 calculates the carbon deposition amount (present value). Concretely, the ECU 70 calculates the carbon deposition amount (present value), based on the carbon deposition amount (previous value) obtained in step S901, the carbon amount reaching the EHC 13 calculated in step S903 and the burned down coefficient calculated in step S904. Namely, the ECU 70 calculates the carbon deposition amount (present value), based on the amount of the remaining carbon in the retention mat 13b, the amount of the carbon attaching to the EHC 13 and the proportion of the amount of the burned down carbon from the retention mat 13b. In this case, the ECU 70 calculates the carbon deposition amount (present value) based on an equation (9). Then, the process goes to step S906.

$$\text{Carbon Deposition Amount (Present Value)} = \{\text{Carbon Deposition Amount (Previous Value)} + \text{Carbon Amount Reaching EHC}\} \times (1 - \text{Burned Down Coefficient}) \quad (9)$$

In step S906, the ECU 70 stores the carbon deposition amount (present value) calculated in step S905. Concretely, the ECU 70 updates the stored carbon deposition amount (previous value) to the calculated carbon deposition amount (present value). For example, the ECU 70 stores the carbon deposition amount (present value) in the SRAM. Then, the process ends.

By the calculation process of the carbon deposition amount, it is possible to accurately estimate the mat water-absorption amount. Therefore, in the above determination process of the EHC warming, it becomes possible to accurately perform the determination using the carbon deposition amount (step S804). Concretely, based on the carbon deposition amount, it becomes possible to accurately determine whether or not the insulation resistance of the retention mat 13b decreases to the value equal to or lower than the predetermined value.

In steps S902, S903, S904, though the generated carbon amount, the carbon amount reaching the EHC 13 and the burned down coefficient are calculated by the functions F21, F22, F23, it is not limited to this. Instead of using the functions, the generated carbon amount, the carbon amount reaching the EHC 13 and the burned down coefficient may be calculated with reference to a preliminarily set map.

Similar to the second embodiment, when the carbon deposition amount (previous value) is not stored, namely when the stored carbon deposition amount (previous value) is cleared, the ECU 70 may set a maximum amount (hereinafter referred to as "maximum carbon deposition amount") of the carbon deposited in the retention mat 13b to the carbon deposition amount (previous value), so as to calculate the carbon deposition amount (present value). Namely, when the present state is the state right after the battery erasing, the maximum carbon deposition amount may be set to the carbon deposition amount (previous value). Therefore, it is possible to certainly prevent the incorrect determination of the insulation resistance of the retention mat 13b, and hence it becomes possible to appropriately prevent the electrical leak of the EHC 13, too. For example, the ECU 70 can use the maximum carbon deposition amount obtained by preliminarily performing an experiment.

[Modification]

The above embodiments show that the insulation resistance of the retention mat 13b is estimated based on any one of the retention mat temperature, the mat water-absorption amount and the carbon deposition amount, so as to determine the permission or prohibition of applying the current to the EHC 13. As another example, the insulation resistance of the retention mat 13b can be estimated based on any two of the retention mat temperature, the mat water-absorption amount and the carbon deposition amount, so as to determine the permission or prohibition of applying the current to the EHC 13. For example, the permission or prohibition of applying the current to the EHC 13 can be determined based on the retention mat temperature and the mat water-absorption amount. In this example, even if the retention mat temperature is lower than the predetermined temperature, when the mat water-absorption amount is equal to or larger than the predetermined amount, the ECU 70 prohibits applying the current to the EHC 13. Additionally, even if the mat water-absorption amount is smaller than the predetermined amount, when the retention mat temperature is equal to or higher than the predetermined temperature, the ECU 70 prohibits applying the current to the EHC 13. Namely, only when the retention mat temperature is lower than the predetermined temperature and the mat water-absorption amount is smaller than the predetermined amount, the ECU 70 permits to apply the current to the EHC 13.

As still another example, the insulation resistance of the retention mat 13b can be estimated based on all of the retention mat temperature, the mat water-absorption amount and the carbon deposition amount, so as to determine the permission or prohibition of applying the current to the EHC 13. In this example, only when the retention mat temperature is lower than the predetermined temperature and the mat water-absorption amount is smaller than the predetermined amount and the carbon deposition amount is smaller than the predetermined amount, the ECU 70 permits to apply the current to the EHC 13. When this condition is not satisfied, the ECU 70 prohibits applying the current to the EHC 13.

It is not limited that the present invention is applied to the normal hybrid vehicle. The present invention can be applied to a so-called "plug-in hybrid vehicle", too. Additionally, the present invention can be applied to a normal vehicle other than the hybrid vehicle, too.

DESCRIPTION OF REFERENCE NUMBERS

1 Engine
12 Exhaust Passage
13 EHC (Electrically Heated Catalyst)
13a EHC Carrier
13b Retention Mat
13c Case
70 ECU
100 Hybrid Vehicle

The invention claimed is:

1. A vehicle control device applied to a vehicle including an internal combustion engine and an electrically heated catalyst which is warmed by applying a current, and includes a catalyst carrier supporting a catalyst and a carrier retention unit that retains the catalyst carrier and has an electrical insulation property, comprising:

an insulation resistance determination unit which determines whether or not an insulation resistance of the carrier retention unit decreases to a value equal to or lower than a predetermined value; and an applying current prohibition unit which prohibits applying the current to the electrically heated catalyst when the insulation resistance determination unit determines that the insulation resistance decreases to the value equal to or lower than the predetermined value.

2. The vehicle control device according to claim 1, wherein, when a temperature of the carrier retention unit is equal to or higher than a predetermined temperature, the insulation resistance determination unit determines that the insulation resistance decreases to the value equal to or lower than the predetermined value.

3. The vehicle control device according to claim 2, further comprising a temperature estimation unit which estimates the temperature of the carrier retention unit, based on heat transfers of the catalyst carrier, the carrier retention unit and a case covering the catalyst carrier and the carrier retention unit, wherein the insulation resistance determination unit performs the determination by using the temperature estimated by the temperature estimation unit.

4. The vehicle control device according to claim 1, wherein, when an amount of water absorbed by the carrier retention unit is equal to or larger than a predetermined amount, the insulation resistance determination unit determines that the insulation resistance decreases to the value equal to or lower than the predetermined value.

5. The vehicle control device according to claim 4, further comprising a water amount estimation unit which estimates the amount of the water absorbed by the carrier retention unit, based on an amount of condensate water generated in an exhaust passage, an amount of condensate water reaching the electrically heated catalyst in the condensate water generated in the exhaust passage and an evaporation coefficient indicating a proportion of an amount of water evaporated by an exhaust heat to the amount of the water absorbed by the carrier retention unit, wherein the insulation resistance determination unit performs the determination by using the amount of the water estimated by the water amount estimation unit.

6. The vehicle control device according to claim 5, wherein the water amount estimation unit repeatedly performs the estimation of the amount of the water, and stores the amount of the water estimated last time so as to perform the estimation of the amount of the water by using the stored amount of the water estimated the last time, and
wherein, when the stored amount of the water estimated the last time is cleared, the water amount estimation unit sets a maximum amount of the water absorbed by the carrier retention unit to the amount of the water estimated the last time so as to perform the estimation.

7. The vehicle control device according to claim 4, further comprising a unit which performs a control of operating the internal combustion engine when the applying current prohibition unit prohibits applying the current to the electrically heated catalyst, and performs a control of continuing the operation of the internal combustion engine so that the water absorbed by the carrier retention unit is evaporated.

8. The vehicle control device according to claim 1, wherein, when an amount of carbon deposited in the carrier retention unit is equal to or larger than a predetermined amount, the insulation resistance determination unit determines that the insulation resistance decreases to the value equal to or lower than the predetermined value.

9. The vehicle control device according to claim 8, further comprising a carbon amount estimation unit which estimates the amount of the carbon deposited in the carrier retention unit, based on an amount of carbon generated in an exhaust passage, an amount of carbon reaching the electrically heated catalyst in the carbon generated in the exhaust passage and a burned down coefficient indicating a proportion of an amount of burned down carbon to the amount of the carbon deposited in the carrier retention unit,
wherein the insulation resistance determination unit performs the determination by using the amount of the carbon estimated by the carbon amount estimation unit.

10. The vehicle control device according to claim 9, wherein the carbon amount estimation unit repeatedly performs the estimation of the amount of the carbon, and stores the amount of the carbon estimated last time so as to perform the estimation of the amount of the carbon by using the stored amount of the carbon estimated the last time, and
wherein, when the stored amount of the carbon estimated the last time is cleared, the carbon amount estimation unit sets a maximum amount of the carbon deposited in the carrier retention unit to the amount of the carbon estimated the last time so as to perform the estimation.

11. The vehicle control device according to claim 8, further comprising a unit which performs a control of operating the internal combustion engine when the applying current prohibition unit prohibits applying the current to the electrically heated catalyst, and performs a control of continuing the operation of the internal combustion engine so that the carbon deposited in the carrier retention unit is burned down.

* * * * *